United States Patent
Sargolzaei et al.

(10) Patent No.: US 9,946,231 B2
(45) Date of Patent: Apr. 17, 2018

(54) DETECTION OF AND RESPONSES TO TIME DELAYS IN NETWORKED CONTROL SYSTEMS

(71) Applicants: Arman Sargolzaei, Miami, FL (US); Mohamed Abdelghani, Greenville, SC (US); Kang K. Yen, Miami, FL (US)

(72) Inventors: Arman Sargolzaei, Miami, FL (US); Mohamed Abdelghani, Greenville, SC (US); Kang K. Yen, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 258 days.

(21) Appl. No.: 14/842,447

(22) Filed: Sep. 1, 2015

(65) Prior Publication Data

US 2017/0060102 A1    Mar. 2, 2017

(51) Int. Cl.
G05B 13/02    (2006.01)
(52) U.S. Cl.
CPC .................. G05B 13/021 (2013.01)
(58) Field of Classification Search
CPC . G05B 13/021; G05B 13/0255; G05B 13/047
See application file for complete search history.

(56) References Cited

U.S. PATENT DOCUMENTS

| | | | | |
|---|---|---|---|---|
| 2007/0268835 A1* | 11/2007 | Kashiwagi | ......... | G05B 19/0425 370/242 |
| 2007/0273307 A1* | 11/2007 | Westrick | ............ | H05B 37/0218 315/312 |
| 2009/0105850 A1* | 4/2009 | Miyata | ................. | G05B 19/042 700/28 |
| 2013/0079899 A1* | 3/2013 | Baramov | ............... | G05B 21/02 700/32 |
| 2014/0222239 A1* | 8/2014 | Watanabe | ................. | H02J 3/32 700/297 |
| 2014/0269704 A1* | 9/2014 | Alexander | .............. | H04W 4/06 370/390 |

OTHER PUBLICATIONS

Bevrani, Robust Power System Frequency Control, Power Electronics and Power Systems, 2009, Springer, New York.
(Continued)

*Primary Examiner* — Mohammad Ali
*Assistant Examiner* — Vincent Chang
(74) *Attorney, Agent, or Firm* — Saliwanchik, Lloyd & Eisenschenk

(57) ABSTRACT

To ameliorate the detrimental effects of time delays, techniques and systems are disclosed for detecting time delays in a plant, facility, or environment (such as a power system) controlled by an NCS, and for providing more resilient control capabilities for adapting to the detected time delays. A time delay estimate can be determined by comparing the expected state of the plant, calculated from a plant model, with the state of the plant described by its telemetry data. Techniques for adapting to a time delay include: switching to an emergency controller and acting in accordance with a local reference model; sending adjusted control commands in accordance with an expected plant state; and instructing a transmitter to transmit subsequent communications packets over multiple redundant communication channels.

13 Claims, 15 Drawing Sheets

Delay Estimator

(56) References Cited

OTHER PUBLICATIONS

Jiang et al., "Delay-dependent stability for load frequency control with constant and time-varying delays," IEEE Transactions on Power Systems, May 2012, pp. 932-941, vol. 27, No. 2.

Chunmao et al., "Adaptive delay estimation and control of networked control systems," International Symposium on Communications and Information Technologies, Oct. 2006, pp. 707-710.

Sargolzaei et al., "Delayed inputs attack on load frequency control in smart grid," IEEE Innovative Smart Grid Technologies Conference, Feb. 2014, pp. 1-5.

Alrifai et al., "On the control of time delay power systems," International Journal of Innovative Computing, Information and Control, Feb. 2013, pp. 769-792, vol. 9, No. 2.

Zhang et al., "Delay-dependent robust load frequency control for time delay power systems," IEEE Transactions on Power Systems, Aug. 2013, pp. 2192-2201, vol. 28, No. 3.

Ma et al., "Distributed model predictive load frequency control of multi-area interconnected power system," International Journal of Electrical Power and Energy Systems, Nov. 2014, pp. 289-298, vol. 62.

Sargolzaei et al., "Assessment of He's homotopy perturbation method for optimal control of linear time-delay systems," Applied Mathematical Sciences, Jan. 2013, pp. 349-361, vol. 7, No. 8.

Sargolzaei et al., "Control of nonlinear heartbeat models under time-delay-switched feedback using emotional learning control," International Journal on Recent Trends in Engineering and Technology, Jan. 2014, pp. 85-91, vol. 10, No. 2.

Sargolzaei et al., "Time-delay switch attack on load frequency control in smart grid," 2013 International Conference on Advanced in Communication Technology, Jan. 2013, pp. 55-64, vol. 5.

\* cited by examiner

DETECTION OF AND RESPONSES TO TIME DELAYS IN NETWORKED CONTROL SYSTEMS

BACKGROUND

Time delays are ubiquitous in nature. They occur in a wide variety of natural and man-made control systems. In an environment with a networked control system (NCS), a physical or virtual device may provide sensor feedback to a controller, which in turn controls the output or operation of the devices via control instructions. Both types of communications may be sent over a communications network. Communications between the device and the controller (both sensing and control communications) are sometimes delayed as a result of the nature of the communications network (e.g., the network uses a slower transmission medium), problems or technical difficulties in the network (e.g., router failure), or the activities of an attacker intentionally attempting to degrade the performance of the network.

Time delays in the sensing and control communications can impact the stability of a system and degrade its performance, for example, when sensor telemetry messages from the device arrive with such a significant delay that it is difficult for the controller to appropriately react and adjust the operations of the device.

In power systems, these types of time delays exist in the sensing and control loops. A "traditional" controller of power systems is designed based on current information being available and ignores time delays even if they are present. However, power grids are constantly being enhanced with new telecommunication technologies for monitoring in order to improve efficiency, reliability, and sustainability of supply and distribution. For example, the introduction of a wide area measurement system (WAMS) provides synchronized near real-time measurements in phase measurement units (PMUs). WAMS can be used for stability analysis of power systems and can be used for efficient controller design. Nevertheless, time delays are present in PMUs measurements as a result of natural transmission lines [D. Dotta, A. S. Silva and I. C. Decker, "Wide-area measurements-based two-level control design considering signal transmission delay", IEEE Trans. on Power Systems, vol. 24, no. 1, 2009].

Furthermore, modern power grids rely on computers and multi-purpose networks, making them vulnerable to cyber-attacks that can cause a major threat to life and economic productivity. A time-delay-switch attack (TDS) is a type of cyber attack where an adversary chooses to introduce delays into an NCS. Thus, it is important to investigate methods of attack on industrial control systems and devise countermeasures and security control protocols that can react to them.

BRIEF SUMMARY

To ameliorate the detrimental effects of time delays, techniques and systems are disclosed for detecting time delays in a plant, facility, or environment (such as a power system) controlled by a network control system, and for providing more resilient control capabilities for adapting to the detected time delays.

Embodiments of the subject invention include techniques and systems for determining if a time delay exists by estimating the amount of time delay and for determining whether the time delay impacts the performance of the system. In some embodiments, a time delay estimate can be determined by comparing the expected state of the plant, calculated from a plant model, with the state of the plant described by its telemetry data. In some embodiments, a time delay can be detected by determining whether timestamps on communication packets sent by the plant over the NCS differ significantly from reference time values when received by remote components (e.g., the controller, time delay detector, and time delay estimator).

Aspects of the subject invention include techniques and systems for adapting to time delays. In some embodiments, a technique for adapting to a time delay can include sending a control instruction that changes the control function from a "normal operations" controller (remote from the plant) to a "local" or emergency controller that can control the plant locally in accordance with a reference plant model.

In some embodiments, a technique for adapting to a time delay includes sending a control signal that has been adjusted/adapted to accommodate for the time delay to devices in the plant. Adjusting or adapting to the time delay may be performed in some cases by an adaptive controller component utilizing time delay estimates from the delay estimator, as well as current plant state (i.e., indicated from the telemetry data, even if a time delay exists) and estimated plant state in accordance with the plant model.

In some embodiments, a technique for adapting to a time delay includes sending instructions to a transmitter at the plant to transmit subsequent communications packets over multiple redundant communication channels. An embodiment may utilize one or more combinations of the aforementioned techniques and systems for detection and adaptive control of time delays, depending on the implementation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
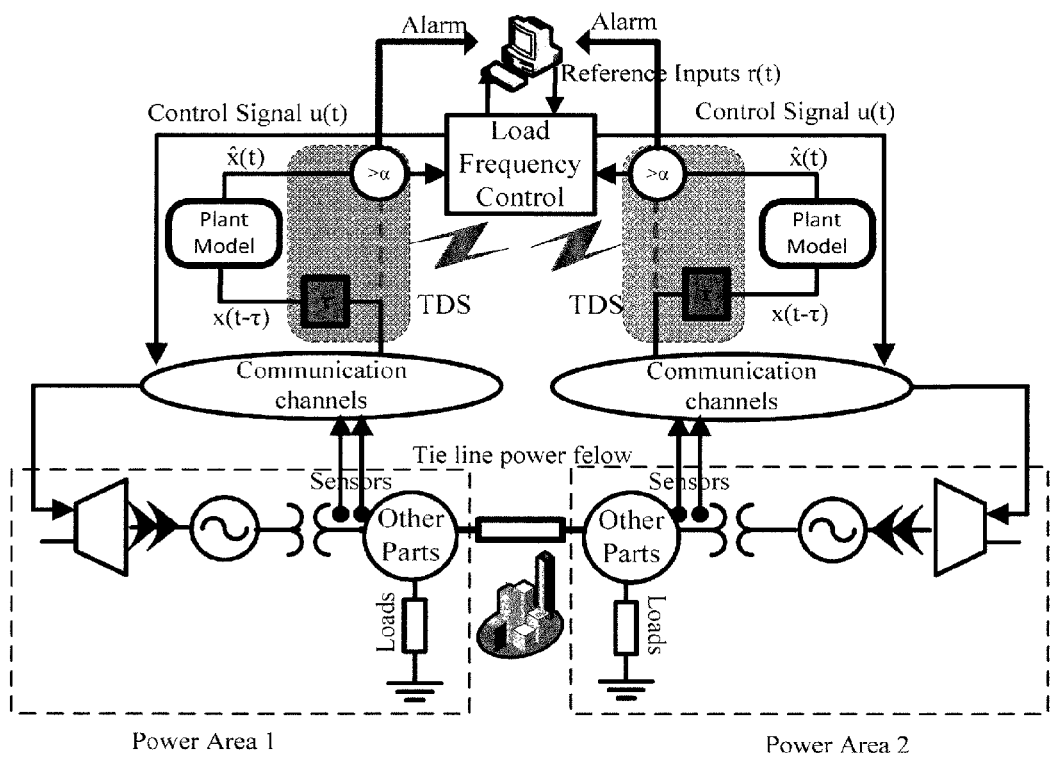
FIG. 1 shows an example of a power plant environment with a two-area power system and a load frequency controller (LFC).

The subject invention describes techniques and systems for detecting time delays in a plant or facility controlled by a network control system, and for providing more resilient control capabilities for adapting to the detected time delays.

As described herein a "plant" refers to the physical system being controlled. However, the meaning of the term is not intended to be limited merely to industrial plants or systems; the meaning encompasses the full range of systems that include a sensor/control loop, i.e., one or more devices with a sensor for gathering telemetry data from the device about its performance or operations, a communications network for sharing the telemetry data, and a controller for receiving the telemetry data and issuing instructions to the devices to adjust operating parameters.

Embodiments of the subject invention include techniques and systems for determining if a time delay exists by estimating the amount of time delay and for determining whether the time delay impacts the performance of the system. Estimating the amount of the time delay can be performed in some embodiments by a time delay estimator whose function is described below. In some embodiments, a time delay estimate can be determined by comparing the expected state of the plant, calculated from a plant model, with the state of the plant described by its telemetry data. In some embodiments, a time delay can be detected by determining whether timestamps on communication packets sent by the plant over the NCS differ significantly from reference time values when received by remote components (e.g., the controller, time delay detector, and time delay estimator).

Aspects of the subject invention include techniques and systems for adapting to time delays. In some embodiments, a technique for adapting to a time delay can include sending a control instruction that changes the control function from a "normal operations" controller (remote from the plant) to a "local" or emergency controller that can control the plant locally in accordance with a reference plant model.

A "plant model" is, for example, a virtual or mathematical model representing the state and control aspects of a particular plant or kind of plant. In some cases, a plant model can be derived from a history of sensed signal. A plant model can also be a "system model." A plant model can be used to compute a current or estimated state of the plant or system being modeled.

In some embodiments, a technique for adapting to a time delay includes sending a control signal that has been adjusted/adapted to accommodate for the time delay to devices in the plant. Adjusting or adapting to the time delay may be performed in some cases by an adaptive controller component utilizing time delay estimates from the delay estimator, as well as current plant state (i.e., indicated from the telemetry data, even if a time delay exists) and estimated plant state in accordance with the plant model.

In some embodiments, a technique for adapting to a time delay includes sending instructions to a transmitter at the plant to transmit subsequent communications packets over multiple redundant communication channels. An embodiment may utilize one or more combinations of the aforementioned techniques and systems for detection and adaptive control of time delays, depending on the implementation.

Systems and techniques of the subject invention advantageously provide adaptive capabilities to reduce the impact of the numerous incidental and intentional time delays that are part of any communications network. Since many plant processes assume optimal controller conditions, i.e., that accurate and timely telemetry data is always available in making a control decision, even small delays in a communication network may significantly impact the efficient or desired operating parameters of the controlled process. Systems and techniques can diminish the detrimental effects of natural or incidental time delays in an NCS as effectively as they can help mitigate the effects of intentional attacks by a cyber-attacker. Thus, technical features of the subject invention may result in improved or more efficient control over an industrial or technical process.

Table 4 shows a summarized form of the nomenclature used in some embodiments.

As noted, time delays in systems can be natural/incidental (e.g., failed/failing equipment, hardware or software defects, severed communications lines, etc.) or intentionally introduced via the activities of an attacker. Attackers use various kinds of network or technological equipment, such as packet injectors, to introduce time delays on a communications network. Attackers can be human beings directing technological equipment to affect the network. Attackers can also be automated agents directing the technological equipment. A "packet" is a unit of information transferred over a communication network. A packet usually contains an information payload along with various routing details, such as the sender of the packet, its destination, and a timestamp of the time sent.

Embodiments of the subject invention may assist in adapting an NCS to various kinds of TDS attack variants, including a "replay" TDS attack, a "timestamp-based" TDS attack, and a "noise-based" TDS attack.

For example, in a replay TDS attack, the attacker leaves the first packet x(0.1) intact. It then records but drops the second packet, x(0.2), and resends in its place the first packet. Subsequently, it sends x(0.2) instead of the third packet, etc. The attacker can generalize this attack by introducing different time delays. Table 1 illustrates the steps of this attack, where the attacker adds a delay of 0.1 seconds.

TABLE 1

Events during a replay TDS attack (TS = timestamp, C and P indicate signal received by the controller and signal sent by the plant)

| TS | {TS, P(t)} | {TS, C(t)} | Controller Input(e(t)) |
|---|---|---|---|
| 0.1 | {0.1, x(0.1)} | {0.1, x(0.1)} | r(0.1) − x(0.1) or 0 |
| 0.2 | {0.2, x(0.2)} | {0.1, x(0.1)} | r(0.2) − x(0.2 − 0.1) or 0 |
| 0.3 | {0.3, x(0.3)} | {0.2, x(0.2)} | r(0.3) − x(0.3 − 0.1) or 0 |

In a timestamp-based TDS attack, the attacker reconstructs the packet to fix the timestamp of the packet so that a timestamp detector is not able to determine the existence of a time delay by reading a timestamp on the packet. As an example, the attacker receives the first packet from the sensor and copies the state value into a buffer, then substitutes the state value of first packet into the second packet and reconstructs the packet. The attacker then forwards the reconstructed packet on to the controller. Table 2 illustrates this attack scenario. In Table 2, $x_1$ denotes the first state value, $x_2$ the second and so forth. If a sensor sends $x_2$ at time 0.2, attacker can copy it. Now consider controller get $x_3$, at time 0.3. At time 0.3, the sensor sends $x_3$. The attacker inserts $x_2$ instead of $x_3$ with the corrected 0.3 timestamps.

Sometimes, cryptographic methods are used to detect manipulation of the timestamp and/or information payload by attackers. For instance, the packets can be authenticated, e.g., using keyed hashes (e.g., HMAC), computed using a key shared only by the controller and the plant. While cryptographic constructs are fast and will introduce only small delays and computing overhead, they are unable to recover from DoS attacks or to recover data delayed or destroyed by the adversary. The controller is therefore forced to request the re-transmission of lost or corrupt packets, leading to additional delays and higher network load that can destabilize the entire system.

TABLE 2

| TS | {TS, P(t)} | {TS, C(t)} | Controller Input |
|---|---|---|---|
| 0.1 | {0.1, x(0.1)} | {0.1, x(0.1)} | $r_1(0.1) - x_1(0.1)$ |
| 0.2 | {0.2, x(0.2)} | {0.2, x(0.1)} | $r_2(0.2) - x_1(0.2) =$ $r_2(0.2) - x_2(0.2 - 0.1)$ |
| 0.3 | {0.3, x(0.3)} | {0.3, x(0.2)} | $r_3(0.3) - x_2(0.3) =$ $r_3(0.3) - x_3(0.3 - 0.1)$ |

In a noise-based TDS attack, the attacker injects fake packets into the system, making the system delay the transmission of real system packets. This way, the packets sent by the sensors are delivered to controller with a delay.

Embodiments of the subject invention are applicable to, for example, a power plant environment with an NCS. FIG. 1 shows an example of a power plant environment with a two-area power system and a load frequency controller (LFC). It should be noted that a power plant is used as an example environment and is not intended to be limiting; techniques and systems of the subject invention are applicable to a wide range of NCS applications.

In a power plant environment with an LFC, the LFC sends control signals to the plant and gets telemetry feedback through the communication channels from plant devices such as the turbines and remote terminal units (RTU's). The totality of the telemetry feedback constitutes the "state" of the plant/system at a given time. The communication channels are often wireless networks, and sometimes the LFC is physically located remotely from the plant devices/sensors.

Suppose, for example, the NCS of the power plant is under attack by an attacker that causes delays in the sensing-control communication channels. Attacks can be launched by, for example, jamming the communication channels (e.g., a denial of service attack), by distorting feedback signals (e.g., a false data injection attack), and by injecting delays in data coming from telemetry sensors (i.e., a TDS attack as described in Sargolzaei, A.; Yen, K.; Abdelghani, M N., "Delayed inputs attack on load frequency control in smart grid," Innovative Smart Grid Technologies Conference (ISGT), 2014 IEEE PES, pp. 1, 5, 19-22 Feb. 2014; which is incorporated herein by reference; Sargolzaei, A; Yen, Kang; Abdelghani, M N, "Time-Delay Switch Attack on Load Frequency Control in Smart Grid", Publication in journal of advanced communication technologies, 2014; which is incorporated herein by reference).

An LFC is usually designed as an optimal feedback controller, but to operate optimally it requires power system information to be telemetered in real time. If an adversary introduces significant time delays in the telemetered control signals or measured states, the LFC will deviate from its optimality and in most cases the system will break down.

An LFC multi-area interlock power system is shown as described in (Liu, S., Liu, X. P., & Saddik, A. E., Denial-of-Service (dos) attacks on load frequency control in smart grids, Paper presented at the Innovative Smart Grid Technologies (ISGT), 2013 IEEE PES. L. Jiang, W. Yao, Q. H. Wu et. al, "Delay-dependent stability for load frequency control with constant and time-varying delays," IEEE Transactions on Power Systems, vol. 27, no. 2, pp. 932-941, 2012. Miaomiao Ma, Hong Chen, Xiangjie Liu, Frank Allgower, "Distributed model predictive load frequency control of multi-area interconnected power system", International Journal of Electrical Power & Energy Systems, Volume 62, November 2014, Pages 289-298, ISSN 0142-0615. Bevrani H, "Robust power system frequency control," SpringerVerlag 2009; each of which are incorporated herein by reference.)

The LFC dynamic model, or "plant model," for the $i^{th}$ area is given by $$\begin{cases} \dot{x}^i(t) = A_{ii}x^i(t) + B_i u^i(t) + h(x^j(t), \Delta P_l^i) \\ x^i(0) = x_0^i \end{cases} \quad (1)$$

where $x \in R^5$ and $u \in R^5$ are the state and the control vectors, respectively. The model of the $i^{th}$ area is influenced by the $j^{th}$ power area. Matrices $A_{ii}$ and $B_i$ are constant matrices with suitable dimensions, $\Delta P_l^i$ is the power deviation of the load. The initial state vector is denoted by $x_0^i$ for the $i^{th}$ power area. Then, the state vector is defined as $$x^i(t) = [\Delta f^i(t) \ \Delta P_g^i(t) \ \Delta P_{lu}^i(t) \ \Delta P_{pf}^i(t) \ \Lambda^i(t)]^T \quad (2)$$

where $\Delta f^i$, $\Delta P_g^i$, $\Delta P_{lu}^i$, $\Delta P_{pf}^i$ and $\Lambda^i$ are frequency deviation, power deviation of the generator, position value of the turbine, tie-line power flow, and control error on the $i^{th}$ power area, respectively [see Sargolzaei et al., "Delayed inputs attack on load frequency control in smart grid," Innovative Smart Grid Technologies Conference (ISGT), 2014 IEEE PES, pp. 1, 5, 19-22 Feb. 2014]. The control error of the $i^{th}$ power area is expressed as $$\Lambda^i(t) = \int_0^t \beta_i \Delta f^i(s) ds \quad (3)$$

where $\beta_i$ denotes the frequency bias factor.

In the dynamic model of the LFC, $A_{ii}$, $B_i$, and $h(x^j(t), \Delta P_l^i)$ are represented by $$A_{ii} = \begin{bmatrix} -\dfrac{\mu}{J_i} & \dfrac{1}{J_i} & 0 & -\dfrac{1}{J_i} & 0 \\ 0 & -\dfrac{1}{T_{tui}} & \dfrac{1}{T_{tui}} & 0 & 0 \\ -\dfrac{1}{\omega_i T_{gi}} & 0 & -\dfrac{1}{T_{gi}} & 0 & 0 \\ \sum_{\substack{i \neq j \\ j=1}}^{N} 2\pi T_{ij} & 0 & 0 & 0 & 0 \\ \beta_i & 0 & 0 & 0 & 1 \end{bmatrix} \quad (4)$$

$$B_i = \begin{bmatrix} 0 & 0 & \frac{1}{T_{gi}} & 0 & 0 \end{bmatrix}^T \quad (5)$$

$$h(x^j(t), \Delta P_l^i) = \sum_{\substack{i \neq j \\ j=1}}^{N} A_{ij} x^j(t) + D_i \Delta P_l^i \quad (6)$$

where N is the total number of power areas, $J_i$, $\omega_i$, $\mu_i$, $T_{g\,i}$ and $T_{tu\,i}$ are the generator moment of inertia, the speed-droop coefficient, generator damping coefficient, the governor time constant, the turbine time constant in the $i^{th}$ power area, and $T_{ij}$ is the stiffness constant between the $i^{th}$ and the $j^{th}$ power areas, respectively. Also, $$A_{ij} = \begin{bmatrix} 0 & 0 & 0 & 0 & 0 \\ 0 & 0 & 0 & 0 & 0 \\ 0 & 0 & 0 & 0 & 0 \\ -2\pi T_{ij} & 0 & 0 & 0 & 0 \\ 0 & 0 & 0 & 0 & 0 \end{bmatrix} \quad (7)$$

and $$D_i = \begin{bmatrix} -\frac{1}{J_i} & 0 & 0 & 0 & 0 \end{bmatrix}^T \quad (8)$$

Equation (9) gives the extension of the dynamic model in Equation (1) to the multi-area power system with the attack model using Equations (4), (5), (6), (7) and (8).

$$\begin{cases} \dot{X}(t) = AX(t) + BU(t) + D\Delta P_l \\ X(0) = X_0 \end{cases} \quad (9)$$

where $$A = \begin{bmatrix} A_{11} & A_{12} & A_{13} & \ldots & A_{1N} \\ A_{21} & A_{22} & A_{23} & \ldots & A_{2N} \\ A_{31} & A_{32} & A_{33} & \ldots & A_{3N} \\ \vdots & \vdots & \vdots & \vdots & \vdots \\ A_{N1} & A_{N2} & A_{N3} & \ldots & A_{NN} \end{bmatrix} \quad (10)$$

$$B = \text{diag}\{[\, B_1^T \;\; B_2^T \;\; B_3^T \;\; \ldots \;\; B_N^T\,]^T\} \quad (11)$$

$$D = \text{diag}\{[\, D_1^T \;\; D_2^T \;\; D_3^T \;\; \ldots \;\; D_N^T\,]^T\} \quad (12)$$

The optimal feedback controller is given by $$U = -K\hat{X} \quad (13)$$

and the new state after the attack can be modeled by $$\begin{bmatrix} \hat{x}_1 \\ \hat{x}_2 \\ \vdots \\ \hat{x}_N \end{bmatrix} = \begin{bmatrix} x_1(t - t_{d1}) \\ x_2(t - t_{d2}) \\ \vdots \\ x_N(t - t_{dN}) \end{bmatrix} \quad (14)$$

In Equation (14), $t_{d1}$, $t_{d2}$, ... and $t_{dN}$ can be different/random time-delays and are positive values. When $t_{d1}, t_{d2}, \ldots, t_{dN}$ are all zero, the system is operating normally. Abnormal operations occur when a delay occurs on the communication link, for example, as a result of equipment failure or intentional attack by an adversary.

Certain embodiments of the subject invention include techniques for time delay estimation. In some embodiments, techniques for time delay estimation may be implemented in a time delay estimator component as shown in the component environments of FIGS. 2, 3, and 4, and operating on a device or system as described with respect to FIG. 13.

In a system that is linear time invariant (LTI), or which can be approximated in a region of interest by an LTI system:

$$\dot{x}(t) = Ax(t) + Bu(t), \quad (15)$$

where x and u are state and control vectors, respectively. Matrices A and B are constant matrices with suitable dimensions whose solution is given by $$x(t) = e^{At} x_0 + \int_0^t e^{A(t-s)} Bu(s) ds, \quad (16)$$

with time delay $\tau$, either a time-delay switch attack or a natural delay, the solution of Equation (16) becomes $$x(t - \tau) = e^{A(t-\tau)} x_0 + \int_0^{t-\tau} e^{A(t-\tau-s)} Bu(s) ds. \quad (17)$$

Writing the solution x(t) at the time t in terms of the solution with the time delay yields, $$\begin{aligned} x(t) &= e^{At} x_0 + e^{A\tau} \int_0^{t-\tau} e^{A(t-s)} e^{-A\tau} Bu(s) ds + \int_{t-\tau}^t e^{A(t-s)} Bu(s) ds \\ &= e^{At} x_0 + e^{A\tau}[x(t-\tau) - e^{A(t-\tau)} x_0] + \int_{t-\tau}^t e^{A(t-s)} Bu(s) ds, \end{aligned} \quad (18)$$

In general, the time delay $\tau$ is an unknown variable. Assume that $\tau$ is slowly varying, compared to the changes in u and x, and $\hat{\tau}$ is the estimate of the time delay $\tau$. Then, $\varepsilon = \hat{\tau} - \tau$ is the estimation error in the time delay. The predicted state $\hat{x}(t)$ of the system based on the estimate of time delay $\hat{\tau}$ is given by $$\hat{x}(t) = e^{At} x_0 + e^{A\hat{\tau}} [\hat{x}(t-\hat{\tau}) - e^{A(t-\hat{\tau})} x_0] + \int_{t-\tau}^t e^{A(t-s)} Bu(s) ds \quad (19)$$

where $\hat{x}(t-\hat{\tau})$ is the estimate of the delayed state based on the estimate of the delay $\hat{\tau}$ (i.e. a simulated signal).

It should be noted that $x(t-\tau)$ is what is actually measured and delivered to the plant model. So, at every instance of time, the variables $\hat{x}(t)$, $\hat{x}(t-\hat{\tau})$, u(t), A, B, and $x(t-\tau)$ are known to the controller and the plant model. On the other hand, the "actual" current state x(t) and the "actual" time delay $\tau$ are unknown. An objective of the system is for the plant model to estimate state x(t) as accurately as possible. A sufficiently accurate estimation of x(t) would benefit from a good estimate of the delay $\tau$.

To estimate the delay $\tau$, the estimation error in states can be described by $e_m(t) = x(t) - \hat{x}(t)$ and, with delay, it is given by $$e_m(t; \tau, \hat{\tau}) = x(t-\tau) - \hat{x}(t-\hat{\tau}) \quad (20)$$

The idea is to estimate $\hat{\tau}$ over time as quickly as possible to minimize the error $e_m(t; \tau, \hat{\tau})$. To do so, let $v = 0.5 e_m^2$. Using the gradient descent method, the form that minimizes the error is:

$$\frac{d\hat{\tau}}{dt} = -\eta \frac{\partial v}{\partial \hat{\tau}} \quad (21)$$

where $\eta$ is the learning parameter to be computed in conjunction with the controller coefficients. Manipulation produces the following form:

$$\frac{d\hat{\tau}}{dt} = -\eta \frac{\partial v}{\partial \hat{\tau}} = -\eta e_m \frac{\partial e_m}{\partial \hat{\tau}} = -\eta e_m \frac{\partial [x(t-\tau) - \hat{x}(t-\hat{\tau})]}{\partial \hat{\tau}} = \quad (22)$$

$$\eta e_m \frac{\partial \hat{x}(t-\hat{\tau})}{\partial \hat{\tau}} = \eta e_m \frac{\partial}{\partial \hat{\tau}} \left[ e^{A(t-\hat{\tau})} x_0 + \int_0^{t-\hat{\tau}} e^{A(t-\hat{\tau}-s)} Bu(s) ds \right] =$$

$$\eta e_m \frac{\partial}{\partial \hat{\tau}} \left[ \int_0^{t-\hat{\tau}} e^{A(t-\hat{\tau}-s)} Bu(s) ds \right] - \eta e_m A e^{A(t-\hat{\tau})} x_0 =$$

$$-\eta e_m \left[ Bu(t-\hat{\tau}) - e^{A(t-\hat{\tau})} Bu(0) - A e^{A(t-\hat{\tau})} x_0 \right].$$

Assuming that $u(0)=0$, a reasonable assumption for the initial time, produces:

$$\frac{d\hat{\tau}}{dt} = -\eta e_m Bu(t-\hat{\tau}) - A e^{A(t-\hat{\tau})} x_0, 0 \le \hat{\tau} \le t \quad (23)$$

Equation (23) may be used to estimate the time delay, $\tau$, in an embodiment where time delay estimation techniques are used. A time delay estimator component may compute the result of Equation (23) for a given case in some embodiments.

Figure 2:
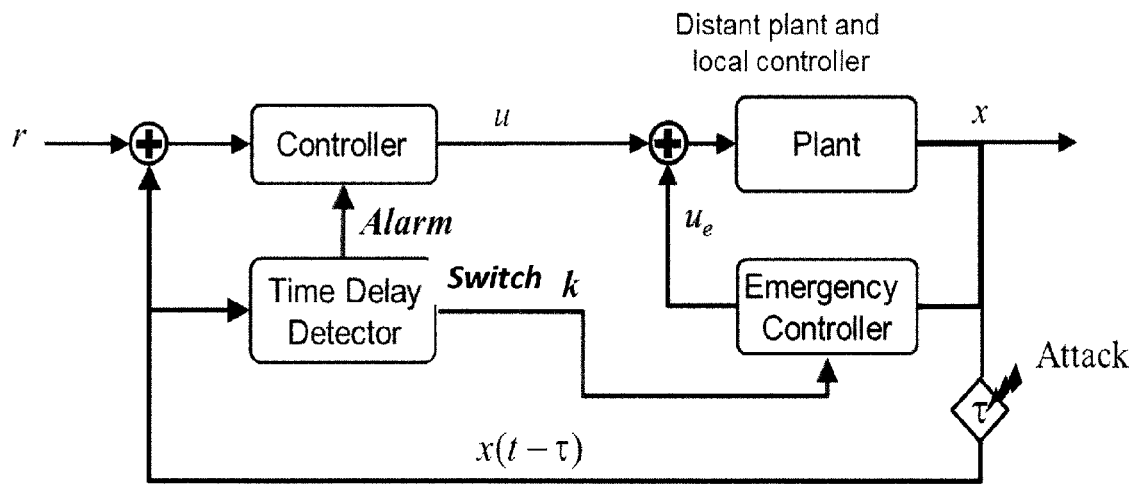
FIG. 2 shows an example component diagram of an NCS with a normal and local/emergency controller.

In some embodiments, a time delay estimate can be considered in determining remedial actions performed by a component of the NCS. In certain embodiments, time delay estimates can be used, for example, by a time delay detector, to direct the system to switch control functions from a "normal operation" controller to a "local" or "emergency" controller (also known as a "failover" controller). FIG. 2 shows an example component diagram of an NCS with a normal and local/emergency controller.

A controller can be, for example, an optimal controller or a proportional-integral-derivative (PID) controller. An optimal controller is tuned to operate a system at the minimum cost in accordance with its system dynamics and cost functions. A PID controller is a control loop feedback mechanism (controller) widely used in industrial control systems. A PID controller calculates an error value as the difference between a measured process variable and a desired set-point. The type of application generally determines the type of controller used.

If the performance error is $e(t)=r(t)-x(t)$, a PID controller can be defined as in Equation (24). Likewise, an optimal controller can be defined as in Equation (25).

$$u(t) = K_P e(t) + K_D \frac{de}{dt}(t) + K_I \int_0^t e(s) ds, \quad (24)$$

$$u(t) = Ke(t). \quad (25)$$

In some embodiments, a normal operation controller can be designed such that it is resilient to some maximum tolerable time delay $\tau_{stable}$. A local or emergency controller can be placed locally to the plant/system so that, in cases where the normal operation controller experiences a time delay in excess of the maximum tolerable time delay, the local controller can assume the control function for the system. For example, the local controller may be attached by a different communications channel (such as secure local wiring) to the system devices. If the normal operation controller experiences a natural or induced time delay, the local controller resident on the alternate communications channel may take over operation and control of the system according to local operating criteria. The objective of the local/emergency controller could be to stabilize the system to a particular reference trajectory $r_E$ in accordance with a local reference plant/system model.

In some cases, performing a normal operation controller to local controller switchover occurs when a time delay occurs on the system with delay $\tau$ and the time delay is estimated to be $\hat{\tau}$. A component of the system, (e.g., a "delay detector") can use the time delay estimate to perform the following function $$D = \begin{cases} 1 & \hat{\tau} > c\tau_{stable} \\ 0 & \text{otherwise} \end{cases}, \quad (26)$$

where c is a constant between 0 and 1. When D=1, an alarm signal is sent to the normal operation controller, instructing it to cease control operations, and a signal is sent to the local/emergency controller to stabilize the plant in accordance with the reference trajectory $r_E$.

Figure 3:
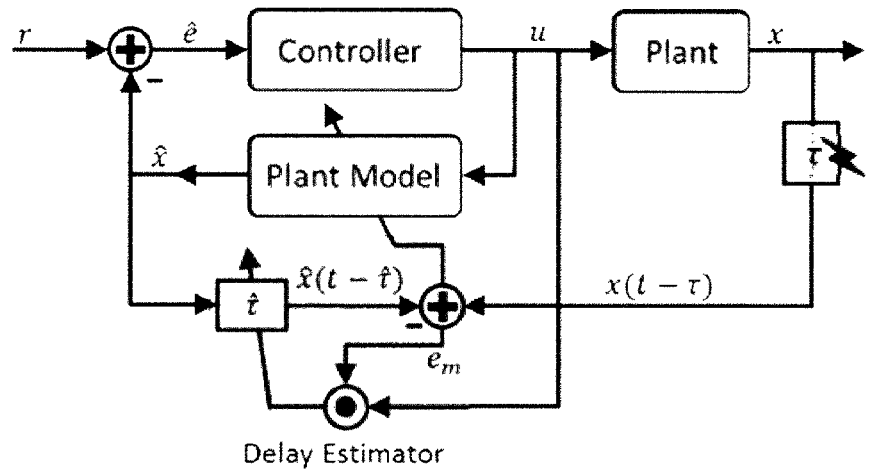
FIG. 3 shows an example component environment and related information flows including an adaptive controller, plant model, and delay estimator.

In certain embodiments, outputs from the time delay estimator can be considered in determining remedial actions performed by an adaptive controller of the system with respect to a plant model. FIG. 3 shows an example component environment and related information flows including an adaptive controller, plant model, and delay estimator.

An adaptive controller can be, for example, a PID controller or an optimal controller, as noted. If the performance error is $e(t)=r(t)-x(t)$, and the estimate of the performance error is $\hat{e}(t)=r(t)-\hat{x}(t)$, a PID controller input can be described in terms of the estimated error as:

$$u(t) = K_P \hat{e}(t) + K_D \frac{d\hat{e}}{dt}(t) + K_I \int_0^t \hat{e}(s) ds \quad (27)$$

and the optimal feedback controller as:

$$u(t) = K\hat{e}(t) \quad (28)$$

The controller depends on the error $\hat{e}(t)$ that results from the estimate $\hat{x}(t)$. If the estimate $\hat{x}(t)$ converges to $x(t)$, then $\hat{e}(t)$ converges to $e(t)$ and is minimized by the controller such that the system $x(t)$ converges to $r(t)$.

Finding a stable adaptive controller may include estimating $\hat{x}(t)$ when $x(t-\tau)$ is known. To estimate $\hat{x}(t)$, start with the plant model estimation equation given by $$\dot{\hat{x}}(t) = A\hat{x}(t) + Bu(t) \quad (29)$$

The delayed equation of the state is, $$\dot{x}(t-\tau) = Ax(t-\tau) + Bu(t-\tau) \quad (30)$$

where $x(t-\tau)$ and $\dot{x}(t-\tau)$ are measured, and $u(t-\tau)$ is unknown since $\tau$ is not known.

In the following Equation (31), some elements are unknown because $\tau$ is unknown.

$$\dot{\hat{x}}(t-\tau) = A\hat{x}(t-\tau) + Bu(t-\tau) \quad (31)$$

Multiplying Equation (31) by a constant gain matrix C>0 and subtracting the resultant $C\dot{\hat{x}}(t-\tau)$ from $\dot{\hat{x}}(t)$ of Equation (29) yields:

$$\dot{\hat{x}}(t)=A\hat{x}(t)+C\dot{\hat{x}}(t-\tau)-CA\hat{x}(t-\tau)-CBu(t-\tau)+Bu(t) \quad (32)$$

Substituting $CBu(t-\tau)=C\dot{x}(t-\tau)-CAx(t-\tau)$ in Equation (32) results in, $$\begin{aligned}\dot{\hat{x}}(t) &= A\hat{x}(t) + Bu(t) + C\dot{\hat{x}}(t-\tau) - CA\hat{x}(t-\tau) - C\dot{x}(t-\tau) + \\ & \quad CAx(t-\tau) \\ &= A\hat{x}(t) + Bu(t) - C[\dot{x}(t-\tau) - \dot{\hat{x}}(t-\tau)] + CA[x(t-\tau) - \\ & \quad \hat{x}(t-\tau)] \\ &= A\hat{x}(t) + Bu(t) - C[\dot{e}_m(t;\tau,\tau) - Ae_m(t;\tau,\tau)]\end{aligned} \quad (33)$$

Replacing $e_m(t;\tau,\tau)$ by $e_m(t;\tau,\hat{\tau})$ of Equation (20) obtains:

$$\dot{\hat{x}}(t)=A\hat{x}(t)+Bu(t)-C[\dot{e}_m(t;\tau,\hat{\tau})-Ae_m(t;\tau,\hat{\tau})] \quad (34)$$

The above replacement makes the current estimate of the plant state $\hat{x}(t)$ dependent on the estimate of the time delay $\hat{\tau}$. In other words, an accurate estimate of the state depends on an accurate estimate of the time delay.

In Equation (34), only if $\dot{e}_m(t;\tau,\hat{\tau})-Ae_m(t;\tau,\hat{\tau})$ goes to zero as a result of $\hat{\tau}$ converging to $\tau$, will $\hat{x}(t)$ converge to $x(t)$. This means that the modeling error $e_m$ should be exponentially damped, i.e., $\dot{e}_m(t;\tau,\hat{\tau})=Ae_m(t;\tau,\hat{\tau})$. The method of constructing the plant estimate depends on the measured states of the plant, $x(t-\tau)$, and the estimate of the state given the estimated time delay, $\hat{x}(t-\hat{\tau})$. The difference $x(t-\tau)-\hat{x}(t-\hat{\tau})$ is the modelling error signal $e_m(t;\tau,\hat{\tau})$.

Embodiments including an adaptive controller can include techniques and systems for computing an adapting control signal with respect to the descriptions and transformations above. Aspects of a delay estimator component may be provided separately, or in conjunction with, an adaptive controller. An adaptive controller can perform the elements or steps of an example process flow as follows:

(S1) As an initial startup condition for the adaptive controller, initialize to their start values: the time delay estimate $\hat{\tau}$, the plant model state estimate $\hat{x}$, and the model error $e_m$. Set the time delay estimator's learning parameter $\eta$ to a suitable value. Also, set the matrix C.

(S2) A plant state measurement that includes the sensed states of the plant $x(t-\tau)$ is received by the adaptive controller from sensors in the plant via the communications network. The plant state measurement is a reading of the sensed state of the plant at time t, but the reading could be delayed by $\tau(t)$.

(S3) Compute the current state estimate $\hat{x}(t)$ using Equation (34).

(S4) Compute the estimated plant state $\hat{x}(t-\hat{\tau})$ based on a plant model equation, an estimate of the performance error $\hat{e}(t)=r(t)-\hat{x}(t)$, and a model error $e_m(t;\tau,\hat{\tau})=x(t-\tau)-\hat{x}(t-\hat{\tau})$.

(S5) Compute the time delay estimate $\hat{\tau}$, from Equation (23).

(S6) Compute an iteration trial control signal u(t). For example, u can be set using Equation (27) when the plant uses a PID-type controller, and by Equation (28) when the plant uses an optimal controller.

In some implementations, because of computational limitations (e.g., computing machines have finite memory and temporal resolution), computation of Equation (23) may benefit from discrete approximation and boundedness assumptions. To assist in the stability of computation and limit memory usage, the following condition, $\tau<\tau_{max}$, may be added as an assumption. In some cases, this condition will allow the construction of a finite buffer to store the history of u(t) from t to $\tau-\tau_{max}$, assisting in the prevention of runaway conditions on $\tau$.

In certain implementations of an adaptive controller, if the delay injected by an adversary is more than $\tau_{max}$, a signal is sent to the supervisory control and data acquisition (SCADA) center and the adaptive controller changes to open loop control (e.g., control without sensor feedback from the plant) to stabilize the system. This is possible since the adaptive controller has a plant model by which it can predict the next state.

In certain implementations, to further assist in the prevention of runaway conditions, boundedness assumptions may constrain the control signal by $\pm u_{max}$, and/or the plant model by $\pm x_{max}$.

(S7) Repeat steps (S2)-(S6) until the estimate of the performance error $\hat{e}<\varepsilon$, and send the iteration trial control signal as a directing control signal to the plant. $\varepsilon$ represents the limit of the plant's tolerance for performance error. In cases where time delay tracking and tracking of a reference trajectory r is being performed, continuously loop from (S2)-(S6).

Certain embodiments of the subject invention include systems and techniques for adaptively allocating additional communication channels in response to TDS attacks on an NCS. The control technology may be referred to herein as "CF-TDSR," which stands for "cryptography-free time delay switch recovery."

Figure 4:
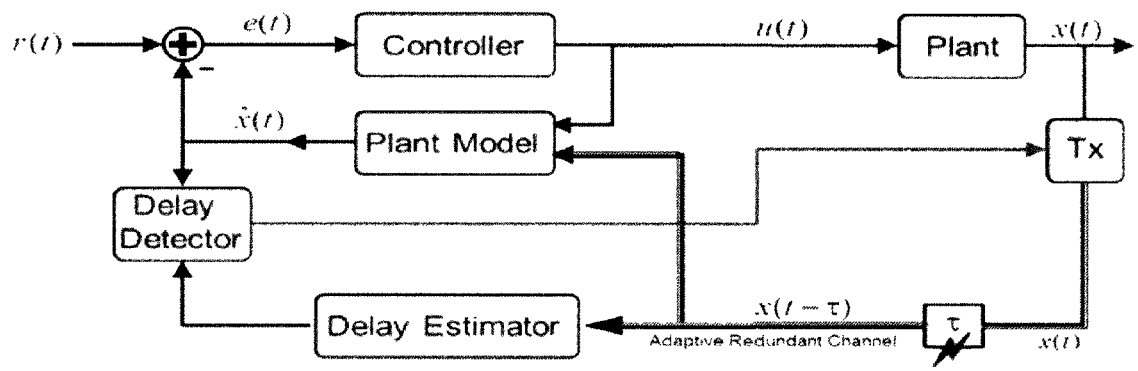
FIG. 4 shows an example component environment in which embodiments of the subject invention having adaptive communication channels can be implemented.

FIG. 4 shows an example component environment in which embodiments of the subject invention having adaptive communication channels can be implemented. Generally, components detect and track time delays introduced by an attacker or natural causes and guide the plant to act in accordance with a reference model in order to guarantee stability for the system.

In FIG. 4, a smart data transmitter (Tx) transmits the telemetry data from sensors at the plant. The transmitter can adaptively allocate more or fewer transmission channels on demand in response to a signal from the time delay detector. The plant model estimates the current plant state and helps stabilize the NCS and plant when under attack. A time delay estimator continuously estimates the time delays on the channels. A time delay detector performs techniques to determine if the estimated delays are detrimental to the system and issues instructions to inform the smart data transmitter and the controller of detrimental delays. A controller (which can be either a PID or optimal controller) produces the control signals to control the system or plant.

Some embodiments of CF-TDSR compare the timestamp on the packets sent by the plant across the communications network to a reference time. In such an environment, each packet sent from a sensor at the plant has a timestamp that a component of the NCS (e.g., a time delay detector or the controller) compares to its own reference time value. The clock values of the sending devices at the plant and the receiving components may benefit from periodic synchronization.

If a discrepancy in the timestamp is detected, then the packet/message is discarded as having been modified, corrupted, or otherwise suspect. The controller will then use the predicted state from the plant model as input to determine the control signal. Alternatively, if the packet indicates a delay, the controller compares the state resulting from the telemetered data in the packet to the predicted state from the plant model. If the difference exceeds a predetermined threshold, the packet is discarded and the controller will use the predicted state from the plant model as input to determine the control signal.

In either case above, an instruction signal may be sent to the transmitter at the plant to transmit subsequent packets over multiple redundant communication channels. The instruction signal can be sent, for example, by the delay detector or controller.

Some embodiments of CF-TDSR do not involve the comparison of timestamps on packets to a reference time. Such embodiments are appropriate, for example, when a communications network without timestamped packets is employed, or when the control system is not time-synchronized with the plant.

In certain embodiments, for instance in those where timestamps are not used, the time delays are continuously estimated while the plant model determines a predicted/estimated state. Time delays may be estimated, for example, by a time delay estimator. The time delay estimator component of CF-TDSR may embody techniques described above for estimating the amount of time delay in a network control system. If the estimated time delays exceed a tolerable maximum for time delays in the plant, the packet is discarded. Furthermore, if the predicted state by the plant model is different from the telemetered state from the plant, the packet is discarded. In either case, an instruction signal may be sent to the transmitter at the plant to transmit subsequent packets over multiple redundant communication channels. The instruction signal can be sent, for example, by the delay detector or controller.

Detection of time delays, with or without the use of timestamps, may be performed in accordance with the process:

$$D(t) = \begin{cases} 1 & (|t_c - t_s| > \tau_{stable}) \text{ or } (|e_m(t)| > \varepsilon) \\ & \text{or } (\hat{\tau} \geq \tau_{stable}) \\ 0 & \text{otherwise} \end{cases} \quad (35)$$

$D(t)$ is the time delay detection function, $t_c$ is the time value of the clock maintained by the NCS (e.g., controller, delay detector), $t_s$ is the time stamp of the packet generated at the transmitter, and $\tau_{stable}$ is the tolerable time-delay (the maximum time delay for which the system remains stable). $e_m(t) = x(t) - \hat{x}(t)$ is the difference between the transmitted state of the plant $x(t)$ and the plant model's record of the system state $\hat{x}(t)$. $\varepsilon$ is the tolerable error value. Since a TDS attack occurs with probability p, then D=1 with probability p and D=0 with probability 1-p. Computation of D(t) may be implemented as part of a delay detector component, which can receive inputs from other system components such as the transmitter, delay estimator, and plant model.

As noted, some embodiments include adaptive redundant communication channels, wherein the transmitter at the plant is directed to transmit sensor state multiple times over additional communications channels. In some circumstances, the number of available communication channels may be limited due to cost or other practical considerations; therefore, some embodiments determine the number of additional channels in reference to the probability of a time delay.

To illustrate certain embodiments, in some cases a TDS attack can be modeled more generally as a denial of service (DoS) attack. In a linear time invariant (LTI) system described by $$\dot{x} = Ax + Bu + w$$

$$u = -Kx \quad (36)$$

where $x \in R^n$ is the state function, $u \in R^n$ is the control function, and matrices A, B and K are constant with appropriate dimensions. The term $w \in R^n$ is an n-dimensional zero-mean Gaussian white noise process. If a given TDS attack occurs with probability p, then $$\dot{x}(t) = \begin{cases} (A - BK)x(t) + w & 1 - p \\ Ax(t) - BKx(t - \tau) & p \end{cases} \quad (37)$$

For simplicity it is assumed that there is the same probability of attack on different channels and states. If a TDS attack occurs, packets are dropped, so the TDS attack formulation can be understood as a DoS attack:

$$\dot{x}(t) = \begin{cases} (A - BK)x(t) + w & 1 - p \\ Ax(t) + w & p \end{cases} \quad (38)$$

Calculating the expectation value of $\dot{x}$ in Equation (38) as:

$$E\dot{x}(t) = [(A - BK)Ex(t) + Ew](1-p)I + [AEx(t) + Ew]pI \quad (39)$$

Let $\mu(t) = Ex(t)$, and Equation (39) can be transformed as:

$$\dot{\mu}(t) = [(A - BK)\mu(t)](1 - p) + A\mu(t)p \quad (40)$$
$$= (A - (1 - p)BK)\mu(t)$$

where Ew=0.

For the system described by Equation (40) to be stable, the mean must approach zero, therefore:

$$\{A - (1-p)IBK < 0\} \quad (41)$$

Hence, $$A - BK + pIBK < 0 \quad (42)$$

i.e., A−BK−PBK is negative definite.
In normal operation the controller evaluates to:

$$A - BK < 0 \quad (43)$$

To maximize stability, the system in Equation (42) should evaluate similarly to the normal operation mode represented by Equation (43). In principle, two kinds of defenses can achieve this outcome: first, decrease the probability of an attack on a given communication channel. Second, change the controller gain.

In some embodiments, the probability of an attack can be decreased when the packet is transmitted multiple times over multiple communication channels. If each packet is sent l times, the probability of a drop or TDS attack decreases by power l:

$$\dot{x}(t) = \begin{cases} (A - BK)x(t) + w & 1 - p^l \\ Ax(t) + w & p^l \end{cases} \quad (44)$$

Equation (42) will take the following form:

$$A(BK)^{-1} - I + (pI)^l < 0 \qquad (45)$$

Therefore, $$A(BK)^{-1} - I < A(BK)^{-1} - I + (pI)^l < A(BK)^{-1} - I + pI < 0 \qquad (46)$$

The condition in Equation (46) illustrates that allocating l>1 channels to increase the redundancy of transmitted plant state will decrease the total probability of faults as a result of a TDS attack. Doing so also brings the controlled system closer to its original state, i.e., A−BK<0. Therefore, adaptively adding one or more communication channel(s) stabilizes the system.

In some cases, the cost of channel redundancy limits the number of communication channels that can be added to address TDS attacks. Some embodiments may change the controller gain K, which may assist when the number of additional channels is limited. Embodiments can include modifying the controller gain parameter to be $K_p = K/(1-p)$. However, adjusting the controller gain K is subject to how well the probability of attack p can be estimated.

Some embodiments include an optimized plant model for stabilizing a system. Consider a power area LFC system of the form:

$$\dot{x}(t) = Ax(t) + Bu(t) + w(t) \qquad (47)$$

with the optimal controller given by $$u(t) = -K\hat{x}(t) = \begin{cases} -Kx(t) & 1 - D(t) \\ -K\hat{x}(t) & D(t) \end{cases} \qquad (48)$$

D(t)=1 when a TDS attack is detected by the delay detector in accordance with Equation (35), or zero otherwise. Recall that the TDS attack can be detected by comparing the received timestamp from the plant against a detector time clock, or by using a time delay estimator. $\hat{x}(t)$ is the new state estimate and is given by $$\dot{\hat{x}}(t) = \begin{cases} Ax(t) + Bu(t) & 1 - D(t) \\ A\hat{x}(t) + Bu(t) & D(t) \end{cases} \qquad (49)$$

Let the estimation error be $e_m(t) = \hat{x}(t) - x(t)$. The dynamics of the closed loop can be calculated as:

$$\dot{x}(t) = \begin{cases} (A - BK)x(t) + w(t) & 1 - D(t) \text{ and } e_m(t) = 0 \\ (A - BK)x(t) - BKe_m(t) + w(t) & D(t) \end{cases} \qquad (50)$$

For reasonable system stability and for the covariance of $e_m(t)$ to remain bounded, the mean of the estimation error $e_m(t)$ should converge to zero. If $e_m(t)$ has bounded covariance then convergence with state x(t) is achieved. The total expectation over both x(t) and D(t), knowing that D(t)=1 with probability p when there is an attack on one channel, can be computed. Expressing the equation of the system under attack as:

$$\dot{x}(t) = \begin{cases} (A - BK)x(t) + w(t) & 1 - p \\ (A - BK)x(t) - BKe_m(t) + w(t) & p \end{cases} \qquad (51)$$

Therefore the total expectation is:

$$\dot{\mu}(t) = (A - BK)\mu(t)(1 - pk) \qquad (52)$$
$$+ (A - BK)\mu(t)p - BK\mu_m(t)p$$
$$= (A - BK)\mu(t) - BK\mu_m(t)p$$

Adding l communication channels results in:

$$\dot{\mu}(t) = (A - BK)\mu(t) - BK\mu_m(t)p^l \qquad (53)$$

If the term $BK\mu_m(t)p^l$ is zero, then Equation (53) converges to zero and the system is stable. That term can be minimized by choosing a large l, or by using a good plant model for the system.

Figure 13:
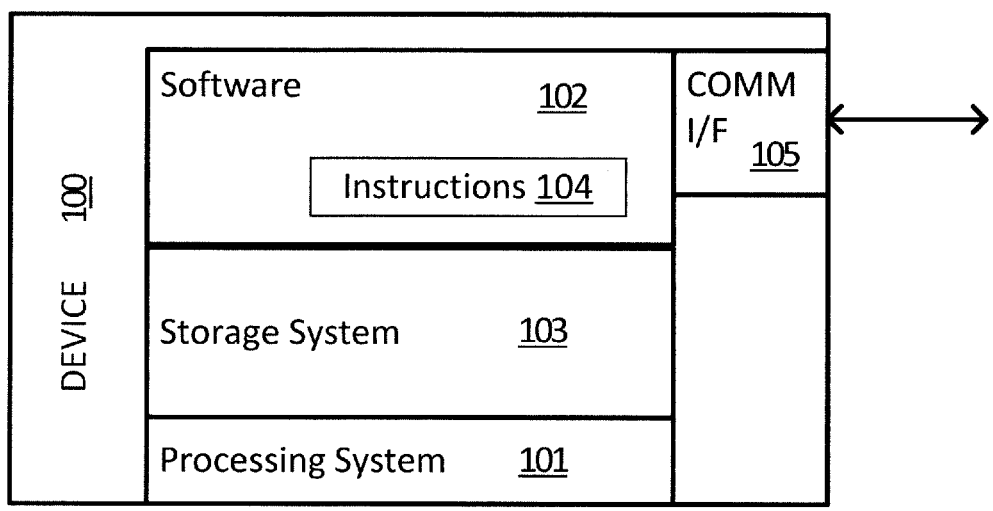
FIG. 13 shows a block diagram illustrating components of a computing device or system used in some implementations or embodiments incorporating techniques and systems for detecting and controlling time delays in an NCS as described herein.

FIG. 13 shows a block diagram illustrating components of a computing device or system used in some implementations or embodiments incorporating techniques and systems for detecting and controlling time delays in an NCS as described herein. For example, any component of the system, including a controller (normal operation or local/emergency), time delay estimator, time delay detector, plant model, and transmitter may be implemented as described with respect to device 100, which can itself include one or more computing devices. The hardware can be configured according to any suitable computer architectures such as a Symmetric Multi-Processing (SMP) architecture or a Non-Uniform Memory Access (NUMA) architecture.

The device 100 can include a processing system 101, which may include a processing device such as a central processing unit (CPU) or microprocessor and other circuitry that retrieves and executes software 102 from storage system 103. Processing system 101 may be implemented within a single processing device but may also be distributed across multiple processing devices or sub-systems that cooperate in executing program instructions.

Examples of processing system 101 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 103 may comprise any computer readable storage media readable by processing system 101 and capable of storing software 102 including, e.g., processing instructions for detecting, estimating, controlling, and/or adaptively controlling time delays in an NCS. Storage system 103 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations, storage system 103 may also include communication media over which software 102 may be communicated internally or externally.

Storage system 103 may be implemented as a single storage device but may also be implemented across multiple storage devices or sub-systems co-located or distributed relative to each other. Storage system 103 may include additional elements capable of communicating with processing system 101.

Software 102 may be implemented in program instructions and, among other functions, may, when executed by device 100 in general or processing system 101 in particular, direct device 100 or processing system 101 to operate as described herein for detecting, estimating, controlling, and/or adaptively controlling time delays in an NCS. Software 102 may provide program instructions 104 that implement components for detecting, estimating, controlling, and/or adaptively controlling time delays in an NCS. Software 102 may implement on device 100 components, programs, agents, or layers that implement in machine-readable processing instructions 104 the methods and techniques described herein.

In general, software 102 may, when loaded into processing system 101 and executed, transform device 100 overall from a general-purpose computing system into a special-purpose computing system customized to detect, estimate, control, and/or adaptively control time delays in an NCS in accordance with the techniques herein. Indeed, encoding software 102 on storage system 103 may transform the physical structure of storage system 103. The specific transformation of the physical structure may depend on various factors in different implementations of this description. Examples of such factors may include, but are not limited to, the technology used to implement the storage media of storage system 103 and whether the computer-storage media are characterized as primary or secondary storage. Software 102 may also include firmware or some other form of machine-readable processing instructions executable by processing system 101. Software 102 may also include additional processes, programs, or components, such as operating system software and other application software.

Device 100 may represent any computing system on which software 102 may be staged and from where software 102 may be distributed, transported, downloaded, or otherwise provided to yet another computing system for deployment and execution, or yet additional distribution.

A communication interface 105 may be included, providing communication connections and devices that allow for communication between device 100 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 100 may be included in a system-on-a-chip (SoC) device. These elements may include, but are not limited to, the processing system 101, a communications interface 105, and even elements of the storage system 103 and software 102.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Following are examples that illustrate procedures for practicing certain disclosed techniques and/or implementing disclosed systems. Examples may also illustrate advantageous technical effects of the disclosed techniques and systems. These examples should not be construed as limiting.

Given a power system model (i.e., a particular plant model) as described with respect to FIG. 1 and the associated text, computational simulations of the adaptive control techniques have been performed in MATLAB 2013a. Examples below show results of the computational simulations using various embodiments. Table 3 shows the parameter values for a two-area power system controller design.

TABLE 3

| Parameter | Value | Parameter | Value |
|---|---|---|---|
| $J_1$ | 10 | $\omega_1$ | 0.05 |
| $\mu_1$ | 1.5 | $T_{g\,1}$ | 0.12 s |
| $T_{tu\,1}$ | 0.2 s | $T_{tu\,2}$ | 0.45 s |
| $T_{12}$ | 0.198 pu/rad | $T_{21}$ | 0.198 pu/rad |
| $J_2$ | 12 | $\omega_2$ | 0.05 |
| $\mu_2$ | 1 | $T_{g\,2}$ | 0.18 s |
| R | 100I | $Q_f$ | 0 |
| Q | 100I | $t_f$ | ∞ |
| $\beta_1$ | 21.5 | $\beta_2$ | 21 |

Example 1

Figure 5A:
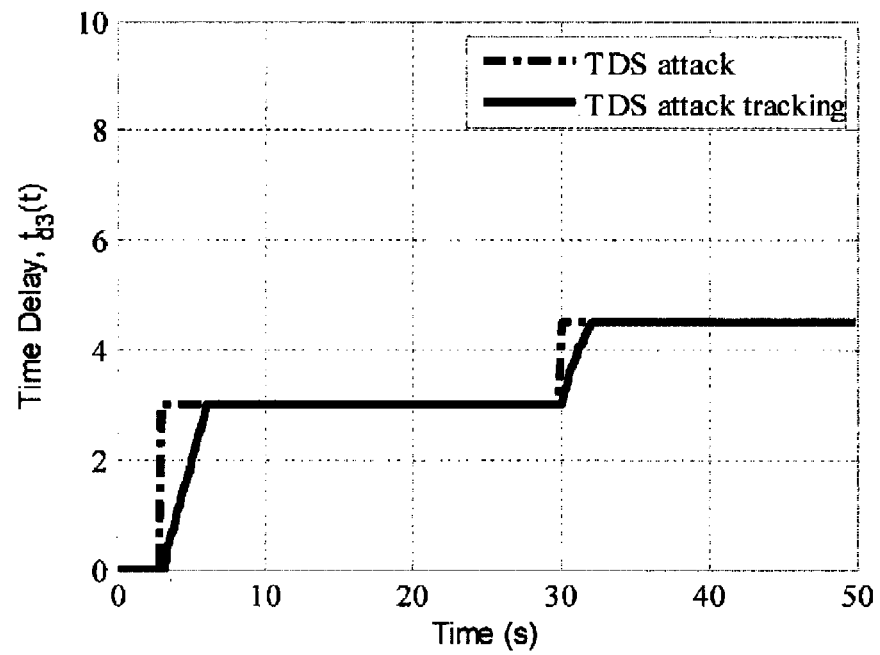
FIGS. 5A-5D show results of simulations in which an ordinary and a local controller are used.
Figure 5B:
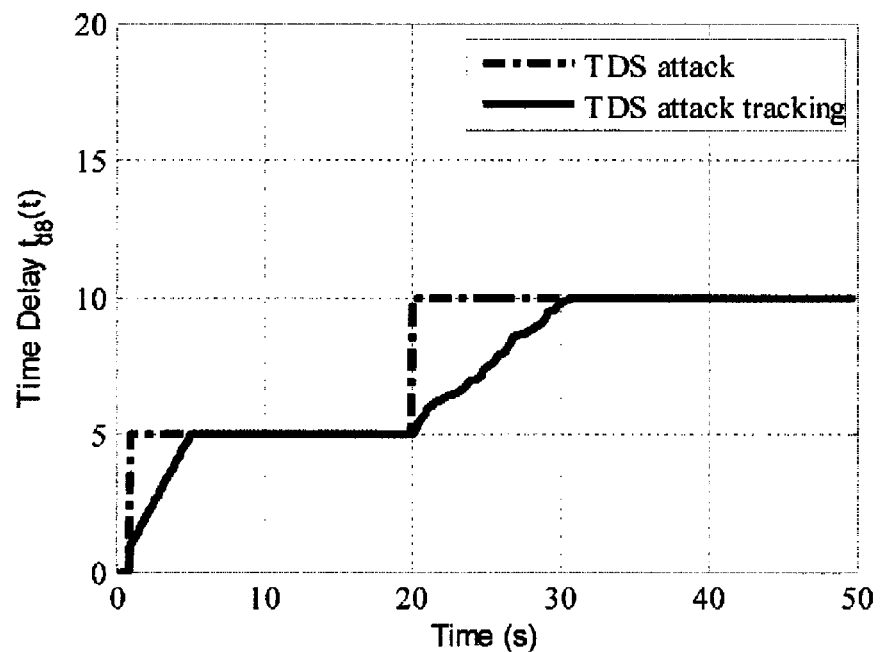

In this simulation, the total simulation time is 50 seconds and the sampling time is 0.01 s. Assume that an adversary performs a TDS attack on feedback lines of both power areas. In the simulation, an attacker starts a TDS attack on the second power area (third state) at time 1 second for $t_{d3}=5$ s and then increases it to $t_{d3}=10$ s at 20 seconds. Furthermore, the adversary starts to attack the first power area (third state), at 1 second with $t_{d8}=3$ s and increased it to $t_{d8}=4.5$ s at 30 seconds. FIG. 5A shows TDS attack detection and tracking for the third state of the first power area. FIG. 5B shows TDS attack detection and tracking for the third state of the second power area.

FIGS. 5A and 5B show that the detection method could follow the time delay attack accurately. The stability value is set to $\tau_{stable}=0.4$ s, based on stability analysis of an LFC system in Sargolzaei, Yen, and Abdelghani ("Time-Delay Switch Attack on Load Frequency Control in Smart Grid", Publication in Journal of Advanced Communication Technologies, 2014.) The detector sends a control instruction to the emergency controller when the detected value of the time-delay is more than the stability maximum for the time-delay.

Figure 5C:
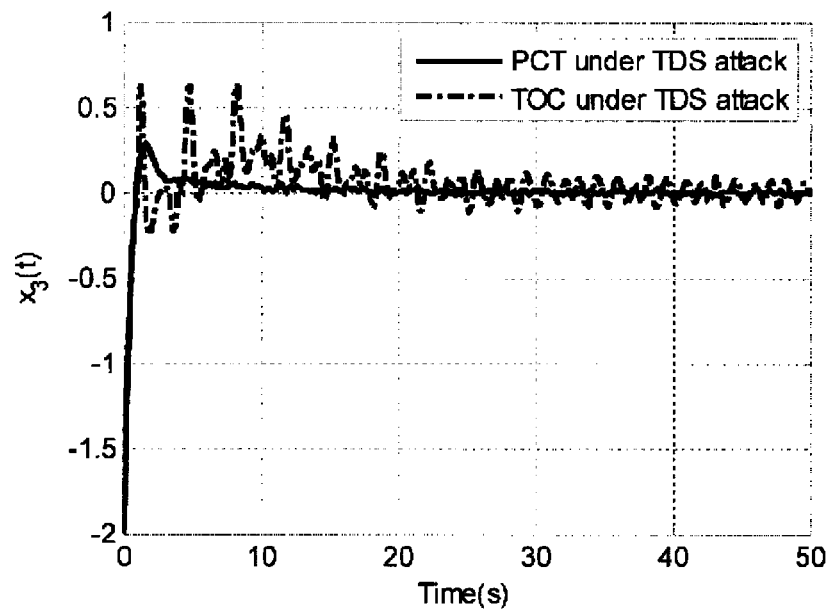
Figure 5D:
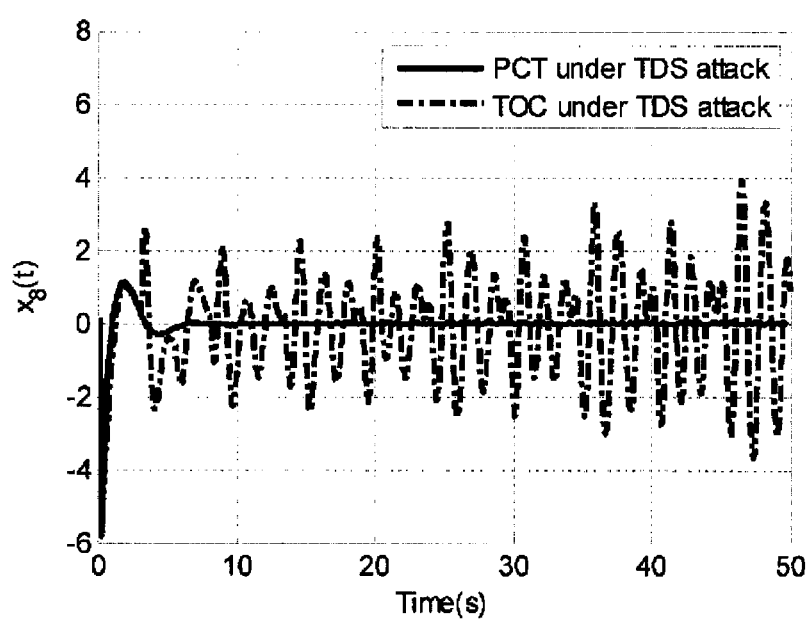

FIGS. 5C-5D show the third state of first and second power areas under attack with the traditional optimal controller (TOC) and proposed control technique (PCT) respectively. The simulated attack makes the system unstable.

After estimating the delay, a control instruction is sent to the local controller. Embodiments of the techniques and systems can overcome a TDS attack on the simulated system.

Example 2

Examples 2-3 show simulations with embodiments including an adaptive controller. Example 2 uses a simple single-input, single-output system under a variable time delay attack with a variable reference signal. This test demonstrates the usability and efficiency of the techniques and systems. The simulation model is given by $$\dot{x}(t) = -0.7x(t) + 2u(t) \quad (54)$$

$$r(t) = \begin{cases} 1 - e^{-\gamma_2 t} & t \le T_a \\ 4e^{-\gamma_1(t-T_b)}(\sin(2\pi\omega_a t) + 1) & \text{otherwise} \end{cases}$$

$$\tau(t) = T_1 e^{-\lambda_1 t}(\sin(2\pi\omega_1 t) + 1) + T_2(1 - e^{-\lambda_2 t}) + 1$$

where the total simulation time T=500 sec., $T_a$=T/2, $T_b$=T/2.2, $T_1$=$T_2$=T/10, $\lambda_1$=0.005, $\lambda_2$=0.0005, $\gamma_1$=0.07, $\gamma_2$=0.004, $\omega_a$=0.06, $\omega_f$=0.005 and the sampling time is 0.01 sec.

Figure 6A:
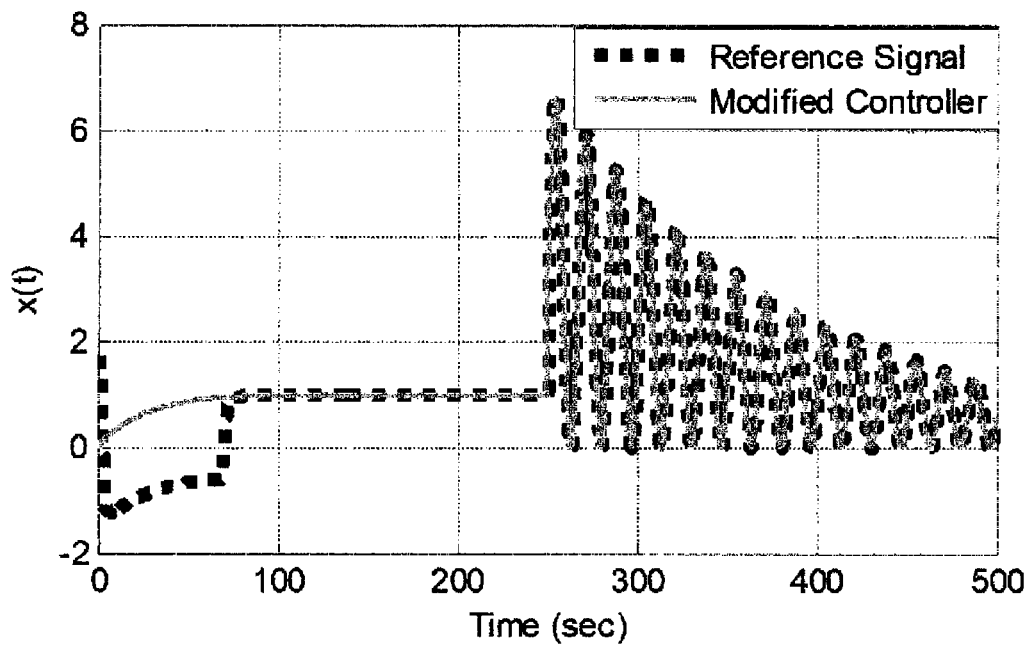
FIGS. 6A-6B show results of simulations including an adaptive controller and a single area power system.

A proposed PID controller tracks the reference signal under TDS attack. FIG. 6A shows the tracking performance of a single-input, single-output system under TDS attack. FIG. 6A indicates the state of the plant given in the Equation (54) and tracking the desired trajectory r(t). The tracking is almost perfect, even though the time delay is varying by τ(t).

Figure 6B:
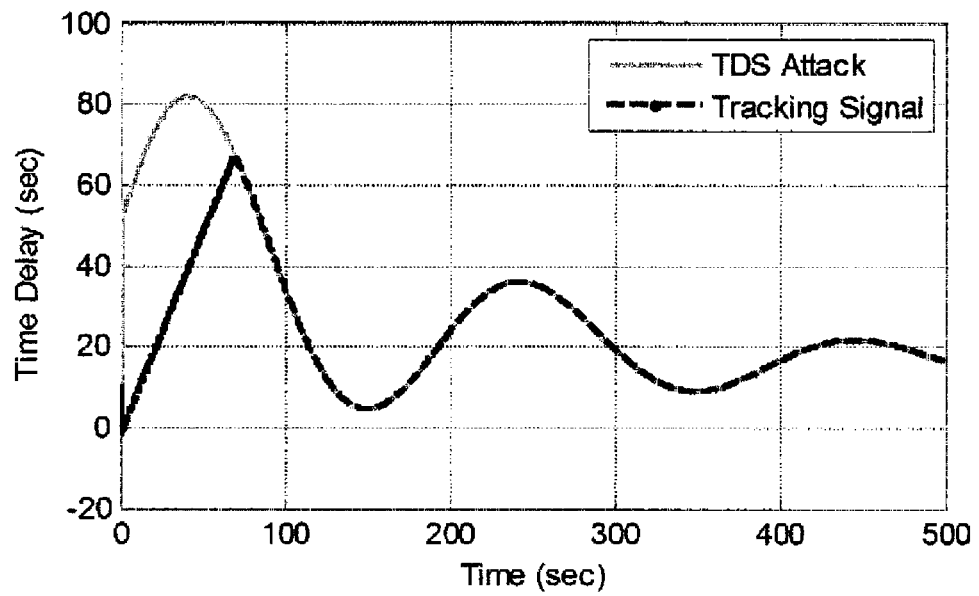

FIG. 6B shows the TDS attack detection and its tracking; the estimated time delay $\hat{\tau}(t)$ tracks the time varying time delay τ(t) that can either be injected by an adversary or occurs naturally. Note that in the first 80 seconds of simulation, the plant is not tracking the reference signal because the time variable t is less than the time delay τ(t). This plant simulation uses a PID controller with the following parameters $K_P$=5, $K_I$=2 and $K_D$=1.5. The time delay estimator learning rate η=0.32 and plant model teacher forcing effort parameter is C=2.

Example 3

Having shown that the simple, modified model-based control and time-delay estimation techniques and systems work for simple single-input, single-output systems under variable time delay attack, distributed power control systems where time delay mitigation strategies are paramount are now considered.

In an LFC system where the controller's job is to regulate the states of a network of power plants, analysis begins with the design of an optimal controller for the LFC in normal operation (e.g., with no attack). Consider a two state power plant model with the performance index described by $$J = \frac{1}{2}\int_0^{t_f} \{X^T(t)QX(t) + U^T(t)RU(t)\}dt \quad (55)$$

where matrix $Q \in R^{n \times n}$ is positive semi-definite and $R \in R^{m \times m}$ is positive definite. The optimal control problem is to obtain optimal control U*(t) that minimizes the performance index in Equation (55), subject to the dynamic of the system with no time-delay in its states.

Simulation studies have been conducted to evaluate the effects of TDS attacks on the dynamics of the system. By solving the Riccati matrix equation, it is possible to design the closed loop control in the form of state feedback. The simulation uses discrete linear-quadratic regulator design from a continuous cost function called "lqrd" function in MATLAB 2013a. For simplicity of discussion, set N=2, for a two-area power system.

Table 3 shows the parameter values used in this process. Since simulation for a certain duration tracks a step load change, both $\Delta P_l^1$ and $\Delta P_l^2$ are set to zero.

Figure 7A:
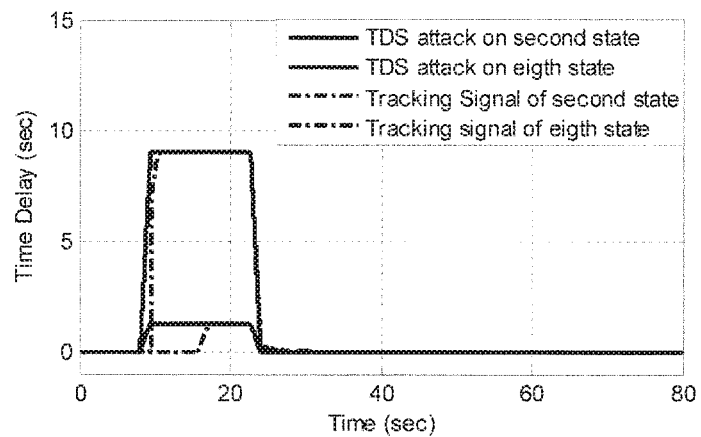
FIGS. 7A-7B show results of simulations including an adaptive controller and a two-area power system.
Figure 7B:
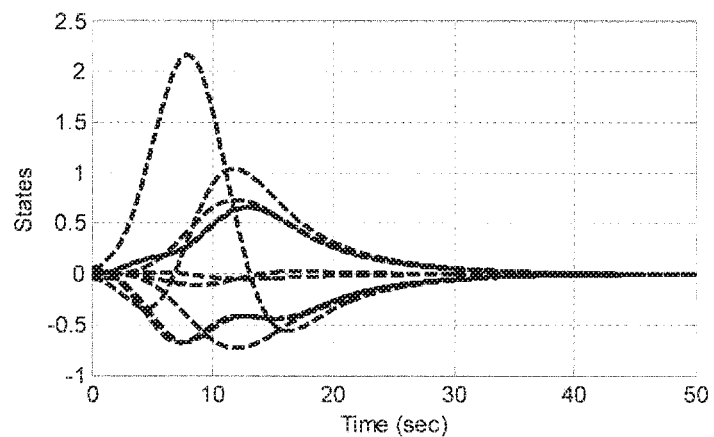

In scenario A, an attacker injects time delays on the second and eighth states, from time 8 s to 24 s, and a delay value of 1.28 s and 9 s, respectively. The LFC system equipped with the time delay estimator performs well. Power states are being regulated to zero and the TDS attack has been detected and time delay tracked. FIG. 7A shows the detection and tracking of the time delay and FIG. 7B shows all states for the two-area interconnected power system. As it is clear from the figures, the modified controller was able to control the LFC distributed system under TDS attack; the signals and the state begin to converge after the first 20 seconds or so.

Figure 8A:
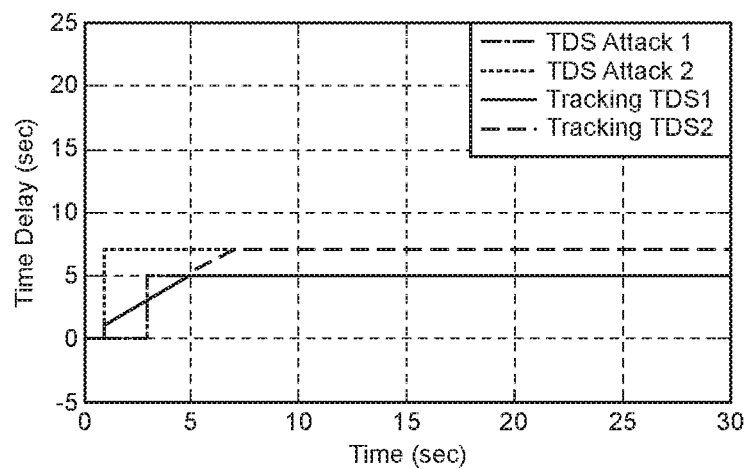
FIGS. 8A-8E show results of simulations including an adaptive controller and a single area power system.
Figure 8B:
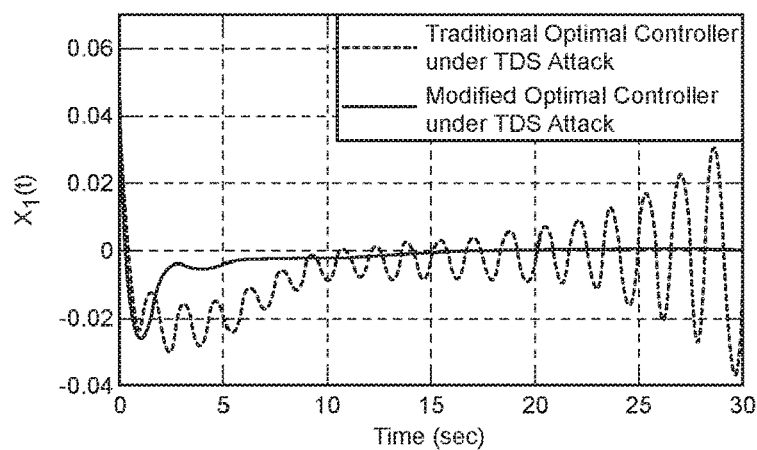
Figure 8C:
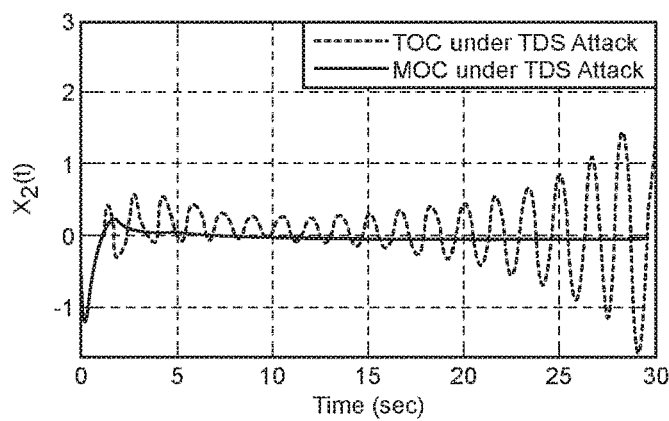
Figure 8D:
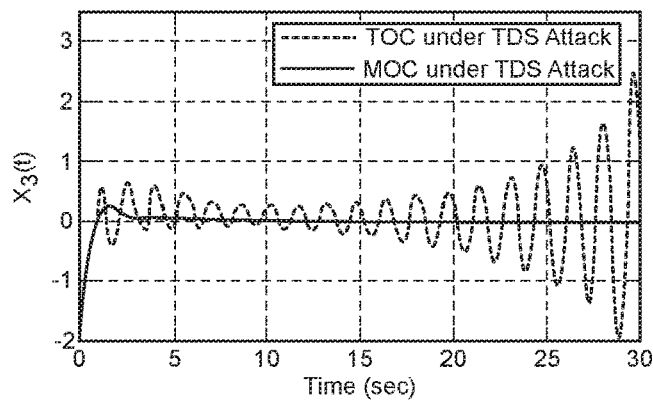
Figure 8E:
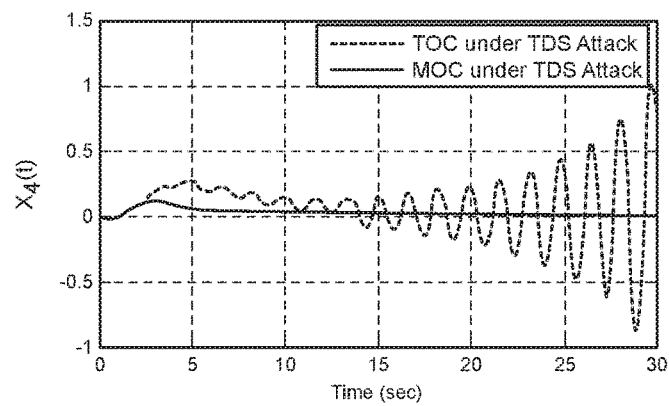

In scenario B, the TDS attack is injected at time 1 s and 3 s for delay values of 5 s and 7 s for the second and eight states. FIG. 8A shows that the tracking scheme works perfectly and could track the TDS attack. FIGS. 8B, 8C, 8D and 8E show simulation results of frequency deviation $\Delta P^K$, power deviation of the generator $\Delta P_g^K$, value position of the turbine $\Delta P_{tu}^K$, and tie-line power flow $\Delta P_{pf}^1$ of the first power area, respectively, with and without the adaptive control method. The figures show that the system will be unstable under TDS attack without the adaptive control techniques and systems. In the figures, TOC and MOC denote the traditional optimal controller and modified optimal controller (adaptive controller), respectively.

Figure 9A:
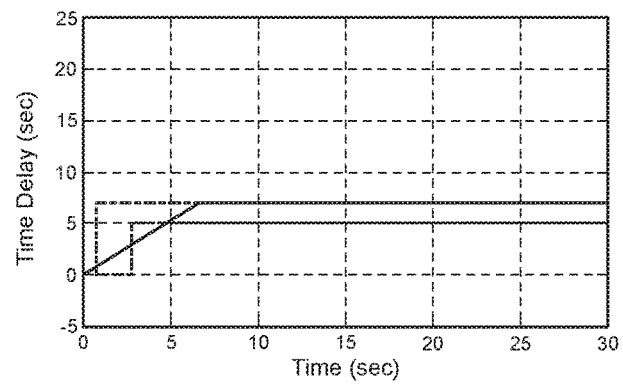
FIGS. 9A-9C show results of simulations including an adaptive controller and a single area power system.
Figure 9B:
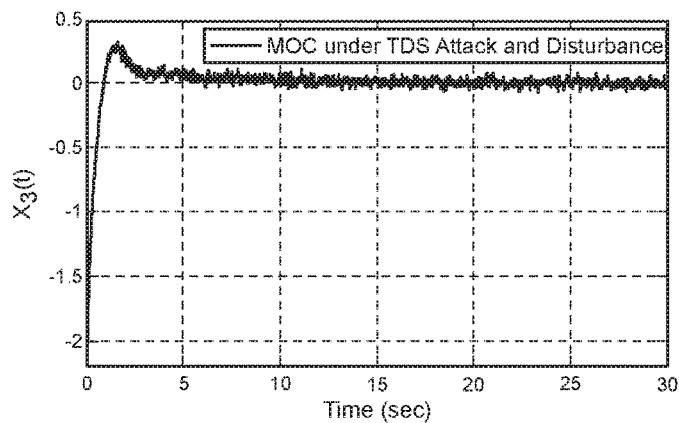
Figure 9C:
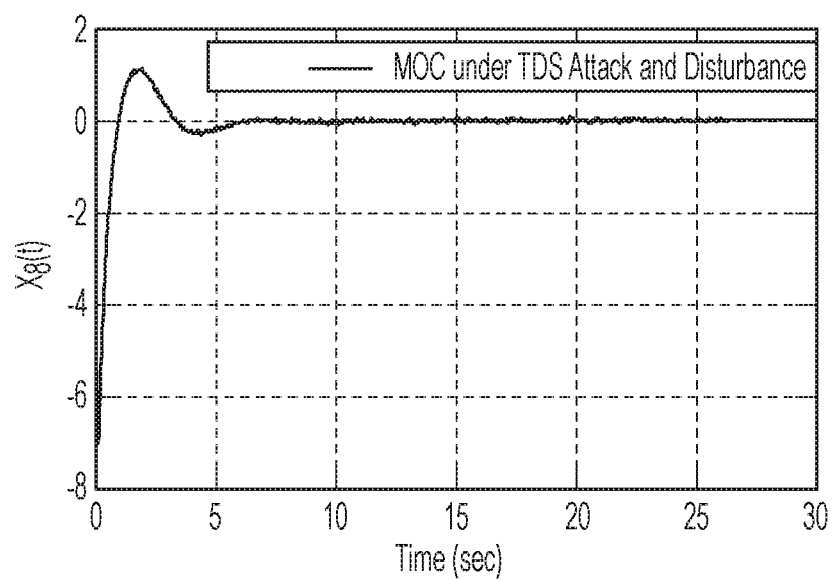

Scenario C is exactly the same as the second scenario, except for 15 percent disturbance and noise added to the system. FIG. 9A shows that the modified control technique could detect, track and control the LFC system under a TDS attack with noise. FIGS. 9B and 9C show the tracking performance of the states of the turbine system under TDS attack for the first and second power control area, respectively.

Example 4

Embodiments of the subject invention including adaptive channel allocation may be used to simulate the performance of the techniques in a one or two-area power system under various time delay conditions.

The simulations evaluate the performance of CF-TDSR under TDS attacks. The simulations use the discrete linear-quadratic regulator design from the lqrd continuous cost function (MATLAB 2013a) to generate the optimal control law for the system in normal operation. Two-area power systems are modeled as described previously. Table 3 shows the parameter values used in the simulation, as noted previously. Simulation conditions set $\Delta P_l^1$ and $\Delta P_l^2$=0, and the sampling time to 0.01 s.

The goal of the simulation is to determine the ability of CF-TDSR to quickly respond to TDS attacks. The total simulation time is 50 seconds. Assume a powerful adversary that has access to the communication channel. The attacker starts the TDS attack with values of $\tau = [t_{d1}\ t_{d2}\ \ldots\ t_{dn}]^T$. Each power area has five states. Since this is a two power area system, n, the total number of states in the interconnected model, is 10. Consider that the attack starts at time $t_a$.

The simulation is performed in three main scenarios: A) Single power plant attack; B) composite TDS attack; and C) simultaneous composite TDS attack on a noisy system and limited available channels.

In scenario A, an adversary has access only to the first power area and thus can only launch TDS attacks on that specific channel. Assume the existence of multiple channels that CF-TDSR can allocate, though in some cases only a limited number of channels may be required. Also assume a powerful adversary that can launch multiple, sequential TDS attack instances.

Figure 10A:
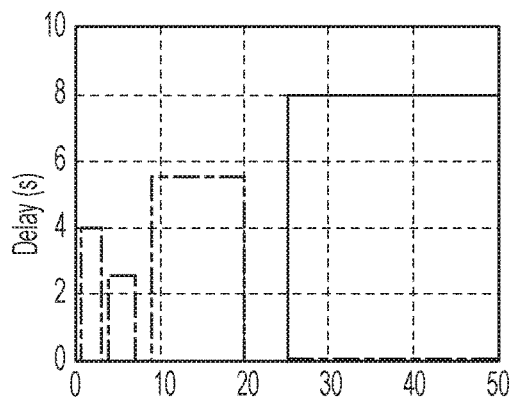
FIGS. 10A-10F show results of simulations including adaptive channel allocation and an attack on a single power area.
Figure 10B:
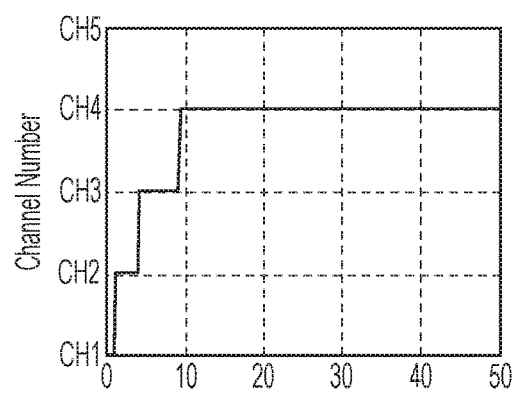

FIGS. 10A-10F show the simulation results. FIG. 10A describes the attack: the first (from left) dashed line denotes a TDS attack on the first channel that occurs at time 1-3 s with a delay of 4 s, followed by a TDS attack on channel 2 between 3-4 s with delay of 2.5 s (second dashed line), then a TDS attack on channel 3 between 9-20 s (third dashed line), and a TDS attack on channel 4, with a delay of 9 s from 25 s to 50 s (fourth dashed line). FIG. 10B shows when CF-TDSR detects each attack and requests a change of channel. The attack on channel 4 is not effective because the system has already approached the stable region. When the system is at optimal value (close to zero), it is harder for a TDS to destabilize the system and force CF-TDSR to request an additional channel. Furthermore, CF-TDSR quickly detects the attacks on different channels.

Figure 10C:
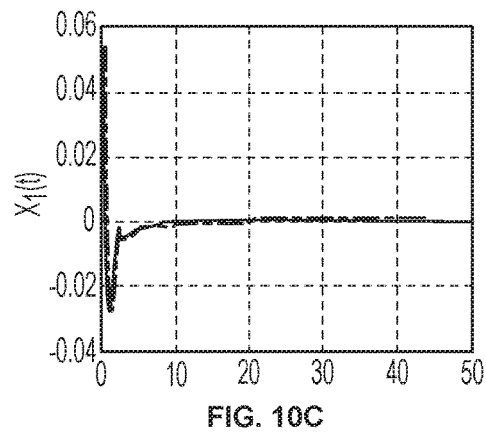
Figure 10D:
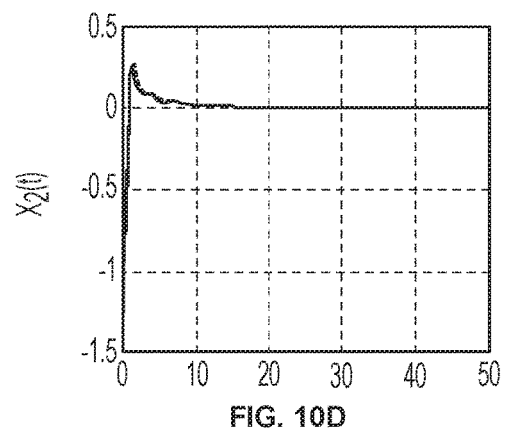
Figure 10E:
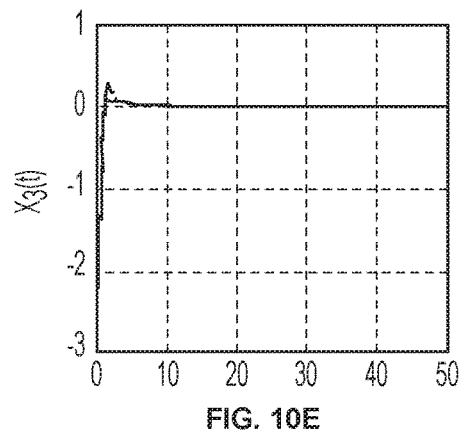
Figure 10F:
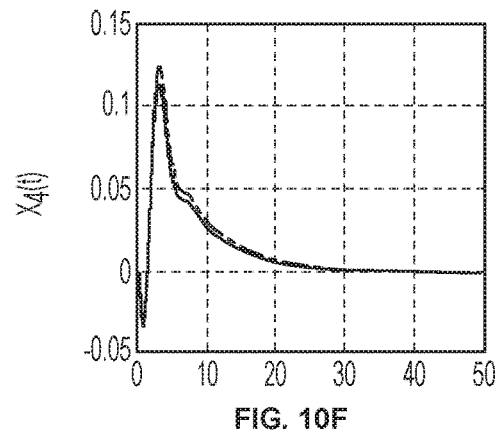

FIG. 10C shows the frequency deviation, $\Delta f^K$, of the power system. FIG. 10D shows the power deviation of the generator, $\Delta f_g^K$. FIG. 10E shows the value position of the turbine, $\Delta f_{tu}^K$. FIG. 10F shows tie-line power flow, $\Delta f_{pf}^l$. These figures prove that the plant states remain stable and converge to zero under TDS attack. FIGS. 10C-10F compared a scenario where the state estimator is on (CF-TDSR, shown in lighter line) to the results of a scenario where the state estimator is off (black dashed line). In both cases, the time-delay estimator and channel adaptation are on. The figures show that CF-TDSR is clearly superior. The results show that the cost function value is improved, $\Delta J$=5.21, when the state estimator is running and takes care of TDS attacks until a new channel is added to the system.

Figure 11A:
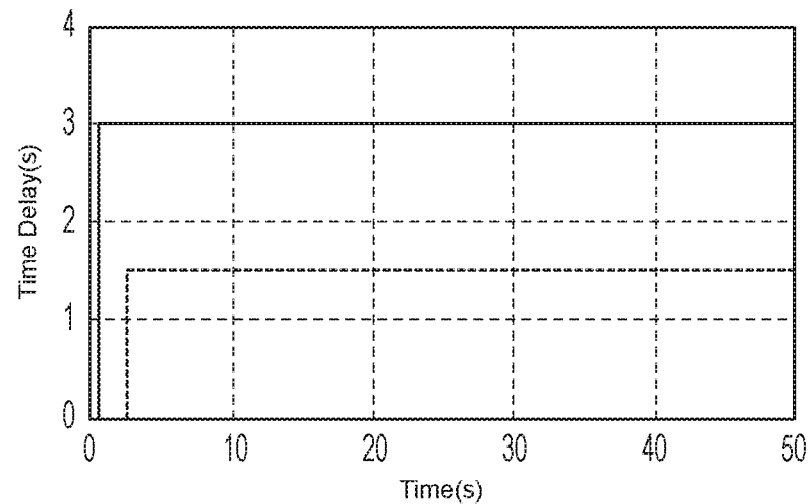
FIGS. 11A-11F show results of simulations including adaptive channel allocation and an attack on multiple power areas.

In scenario B, an adversary that attacks the third state of the first and the second power areas is evaluated. The third state of each area provides the feedback and is thus ideal for the TDS attack. The attack starts at $t_a$=1 s for the first power area and at $t_a$=3 s for the second area, with time-delay values of $t_{d3}$=1.5 s (third state of first plant) and $t_{d8}$=3 s, respectively. FIG. 11A illustrates the TDS attack. Only one extra channel is available.

The behavior of the LFC distributed power system under attack is evaluated in three ways. The first is called "Baseline," running without any modifications to the communication protocol and to the controller. The second is called "Adaptive" and evaluates the LFC under attack when using the adaptive communication protocol. The third evaluates the LFC system when using CF-TDSR, i.e., using both the adaptive communication protocol and the controller design defenses. The results are shown in the figures by varying line styles.

Figure 11B:
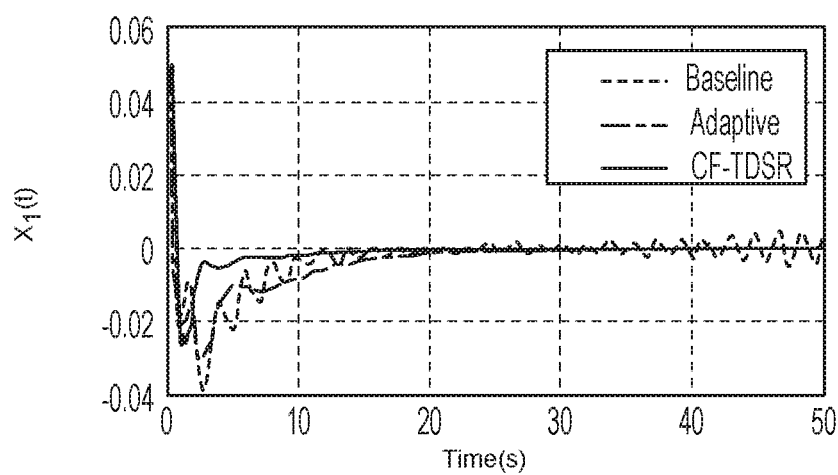
Figure 11C:
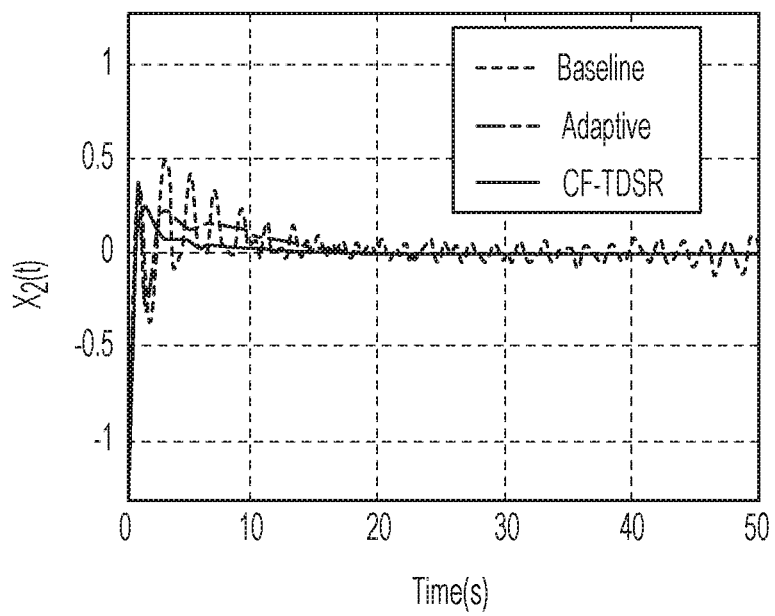
Figure 11D:
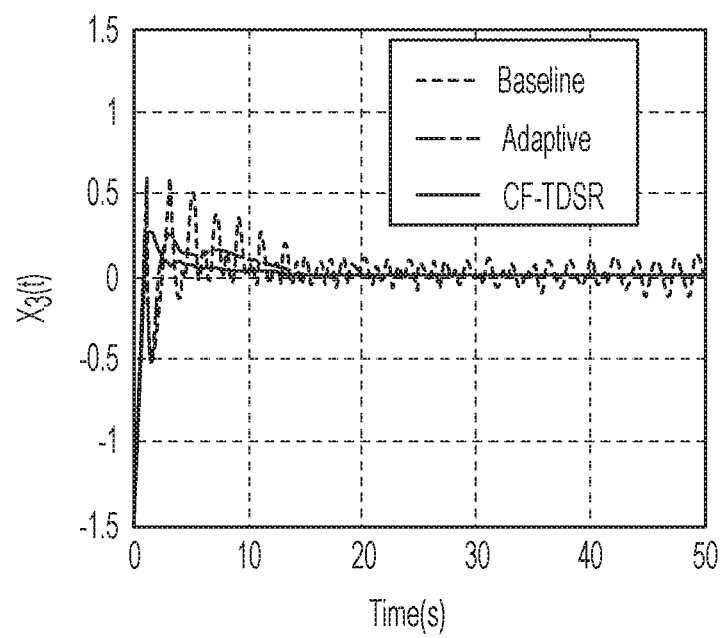
Figure 11E:
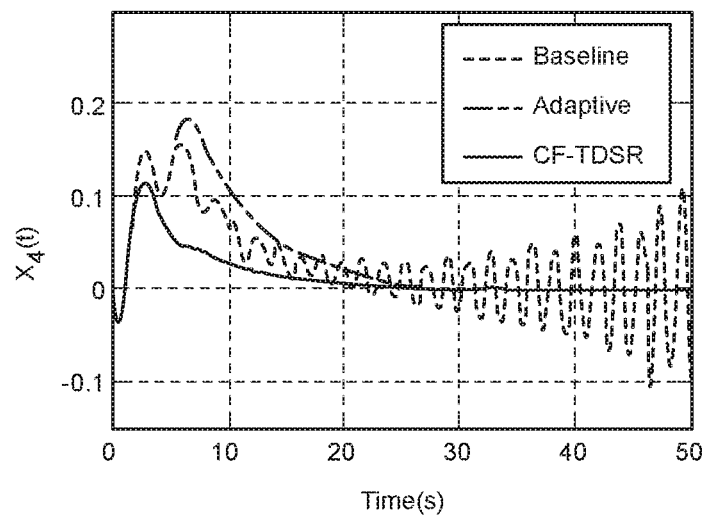
Figure 11F:
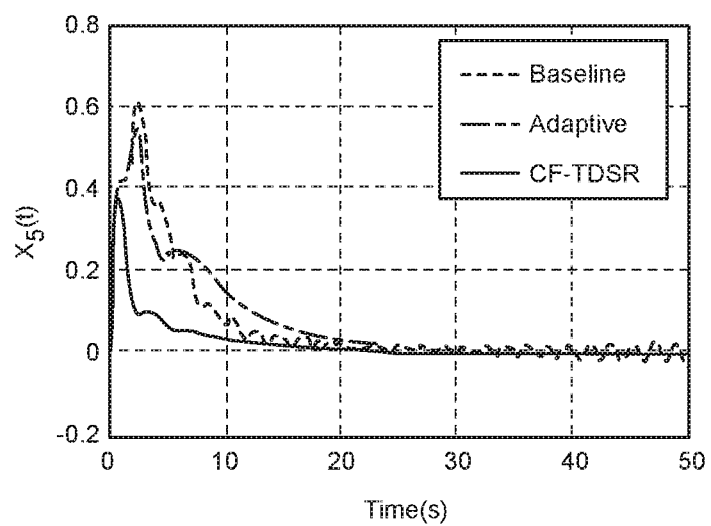

FIGS. 11B-11F show that CF-TDSR is capable of quickly detecting the TDS attack and adapting the communication channels. Note that when CF-TDSR detects a delay larger than 0.4 s, it sends an alert. FIG. 11B shows the frequency deviation, FIG. 11C shows the power deviation of the generator, FIG. 11D shows the value position of the turbine, and FIG. 11E shows the tie-line power flow of the first power area. FIG. 11F shows the control error. The figures show that the system becomes stable only when using CF-TDSR.

If CF-TDSR detects a TDS attack on the second channel, the delay estimator turns on and stays alive for the entire time and guarantees the stability of the system. The results show that CF-TDSR works very well even with strict limitations on the number of available channels, as evidenced by all states converging to zero as expected.

In scenario C, the system behavior is simulated in a TDS attack under a noisy system with limited available channels. White Gaussian noise in the amount of 20% has been added to the communication channel. A TDS attack is then launched on both power areas: the attacker simultaneously launches the attack on the third state of both the first and the second power areas at time 1 s and 4 s, both with a 2 s delay. Then, the delay value was increased at time 7 s to value of 5 s and 6.5 s. In this experiment, assume the availability of only a single communication channel; even adding a single channel is a luxury; this assumption severely restricts CF-TDSR's options.

Figure 12A:
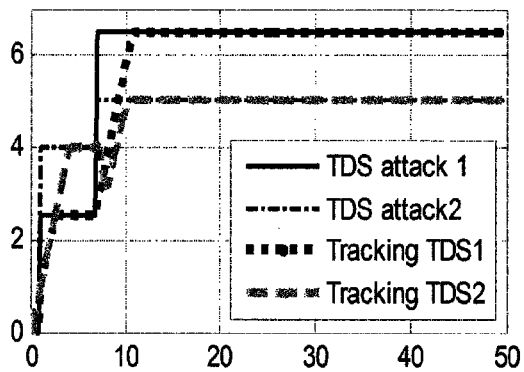
FIGS. 12A-12C show results of simulations including adaptive channel allocation with noise.
Figure 12B:
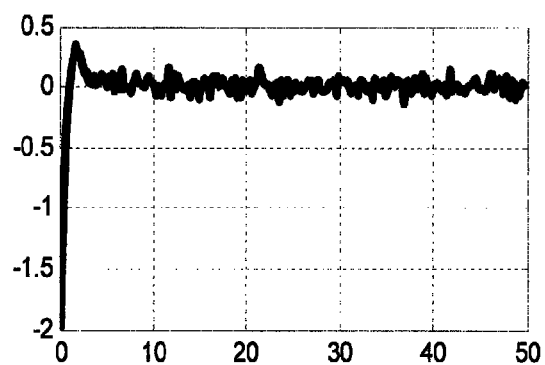
Figure 12C:
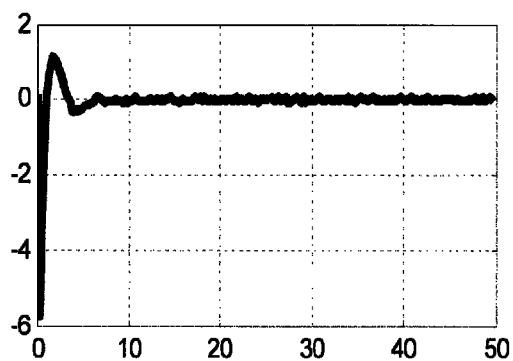

FIGS. 12A-12C show that even under such restrictions, CF-TDSR is able to accurately detect and prevent the noise based TDS attack. Specifically, FIG. 12A shows how CF-TDSR detects and tracks the TDS attack in real time. FIGS. 12B and 12C show the third states (the value position of the turbine, $\Delta P_{tu}^K$) of the first and second power areas, respectively, under the noise-based TDS attack. They show that CF-TDSR performs very well even in the absence of additional communication channels.

TABLE 4

Nomenclature

| Symbol | Definition | Symbol | Definition |
|---|---|---|---|
| x(t) | State vector | $\Delta f$ | Frequency deviation |
| u(t) | Control vector | $\Delta P_g$ | Power deviation of the generator |
| $\Delta P_l$ | Power deviation of the load | $\Delta P_{tu}$ | Position value of the turbine |
| A | Constant matrix | $\Delta P_{pf}$ | Tie-line power flow |
| B | Constant matrix | $\Lambda$ | Control error |
| i, j | Power area indices | $\beta$ | Frequency bias factor |
| J | Generator moment of inertia | $\mu$ | Generator damping coefficient |
| $\omega$ | Speed-droop coefficient | $T_g$ | Governor time constant |
| $T_{tu}$ | Turbine time constant | T | Stiffness constant |
| K | The feedback optimal control gain | $t_d$ | Time delay in the model |
| $\tau$ | Time delay in control design | $\hat{\tau}$ | Estimate of the time delay |
| t | Time | x(t − τ) | Time delayed state |
| ε | Error of the time delay estimation | $\hat{x}$(t − τ) | Delayed estimate of the state |

TABLE 4-continued

Nomenclature

| Symbol | Definition | Symbol | Definition |
|---|---|---|---|
| $e_m$ | Modeling error | $\eta$ | Learning parameter |
| $\tau_{max}$ | Maximum time-delay allowed | $r(t)$ | Reference signal to be tracked |
| e | Performance error | $\hat{e}$ | Estimate of performance error |

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Alrifai, Muthana Taleb, et al. "On the control of time delay power systems." International Journal of Innovative Computing, Information and Control 9.2 (2013): 769-792.

Bevrani, H. "Robust power system frequency control". New York: SpringerVerlag, 2009.

Chuan-ke Zhang; Jiang, L.; Wu, Q. H.; Yong He; Min Wu, "Delay-Dependent Robust Load Frequency Control for Time Delay Power Systems," Power Systems, IEEE Transactions on, vol. 28, no. 3, pp. 2192, 2201, August 2013.

L. Jiang, W. Yao, Q. H. Wu et. al, "Delay-dependent stability for load frequency control with constant and time-varying delays," IEEE Transactions on Power Systems, vol. 27, no. 2, pp. 932-941, 2012.

Li Chunmao; Xiao Jian, "Adaptive Delay Estimation and Control of Networked Control systems," Communications and Information Technologies, 2006. ISCIT '06. International Symposium on, vol., no., pp. 707, 710, Oct. 18 2006-Sep. 20 2006.

Miaomiao Ma, Hong Chen, Xiangjie Liu, Frank Allgöwer, "Distributed model predictive load frequency control of multi-area interconnected power system", International Journal of Electrical Power & Energy Systems, Volume 62, November 2014, Pages 289-298, ISSN 0142-0615.

Sargolzaei, Arman, et al. "Assessment of He's Homotopy Perturbation Method for Optimal Control of Linear Time-Delay Systems." Applied Mathematical Sciences 7.8 (2013): 349-361.

Sargolzaei, Arman, Kang K. Yen, and M. N. Abdelghani. "Control of Nonlinear Heartbeat Models under Time-Delay-Switched Feedback Using Emotional Learning Control." International Journal on Recent Trends in Engineering & Technology 10.2 (2014).

Sargolzaei, A.; Yen, K.; Abdelghani, M N., "Delayed inputs attack on load frequency control in smart grid," Innovative Smart Grid Technologies Conference (ISGT), 2014 IEEE PES, pp. 1, 5, 19-22 Feb. 2014.

Sargolzaei, A; Yen, Kang; Abdelghani, M N, "Time-Delay Switch Attack on Load Frequency Control in Smart Grid", Publication in journal of advanced communication technologies, 2014.

What is claimed is:

1. A method of controlling the effect of time delays in a networked control system (NCS), the method comprising:
   detecting, by one or more sensors, telemetry data of the NCS;
   receiving a communication packet containing the telemetry data from the one or more sensors;
   detecting, by a controller in operable communication with the one or more sensors, a time delay event from an analysis of the communication packet;
   determining a control signal in accordance with the time delay event; and
   sending, by a transmitter in operable communication with the controller, to at least one device in the NCS, the control signal determined in accordance with the time delay event, the control signal controlling the at least one device in the NCS, and
   the determining of the control signal comprising:
   (A) computing a current plant state from the telemetry data and a plant model;
   (B) computing an estimated plant state based on the plant model, a performance error estimate, and a model error;
   (C) computing a time delay estimate;
   (D) determining an iteration trial control signal for a controller type; and
   (E) repeating steps (A)-(D) until the performance error estimate is lower than an error tolerance value, and setting the control signal to the iteration trial control signal.

2. The method of claim 1, wherein detecting the time delay event comprises:
   determining whether a timestamp of the communication packet differs from a reference time value of the NCS by more than a stability value.

3. The method of claim 1, wherein detecting the time delay event comprises:
   comparing the time delay estimate to a stability value.

4. The method of claim 1, wherein detecting the time delay event comprises:
   comparing a received plant state, indicated by the telemetry data, to the estimate plant state.

5. The method of claim 1, wherein the control signal comprises a control instruction to transfer NCS control to a local controller.

6. The method of claim 1, wherein the control signal is an instruction to transmit one or more subsequent communication packets over a plurality of redundant communication channels.

7. A system for controlling the effect of time delays in a networked control system (NCS), the system comprising:

a controller;

a transmitter in operable communication with the controller;

one or more sensors in operable communication with the controller and detecting telemetry data;

one or more non-transitory computer readable storage media;

a plant model for determining an estimated plant state from the telemetry data; and program instructions for a delay detector stored on at least one of the one or more non-transitory computer readable storage media that, when executed by a processing system, direct the processing system to:

in response to receiving one or more communication packets containing the telemetry data from the one or more sensors:

detect a time delay event from an analysis of the one or more communication packets;

determine a control signal in accordance with the time delay event; and send, to at least one device in the NCS, the control signal determined in accordance with the time delay event, the control signal controlling the at least one device in the NCS, and the program instructions for determining the control signal comprising instructions that direct the processing system to:

(A) compute a current plant state from the telemetry data and the plant model;

(B) compute the estimated plant state based on the plant model, a performance error estimate, and a model error;

(C) compute a time delay estimate;

(D) determine an iteration trial control signal for a controller type; and (E) repeat steps (A)-(D) until the performance error estimate is lower than an error tolerance value, and setting the control signal to the iteration trial control signal.

8. The system of claim 7, wherein the program instructions to detect the time delay event comprise instructions that direct the processing system to:

determine whether a timestamp of the one or more communication packets differs from a reference time value of the NCS by more than a stability value.

9. The system of claim 7, wherein the program instructions to detect the time delay event comprise instructions that direct the processing system to:

compare the time delay estimate to a stability value.

10. The system of claim 7, wherein the program instructions to detect the time delay event comprise instructions that direct the processing system to:

compare a received plant state, indicated by the telemetry data, to the estimated plant state.

11. The system of claim 7, wherein the control signal comprises a control instruction to transfer control from a networked controller to a local controller having a local reference model.

12. The system of claim 7, further comprising an NCS transmitter that, in response to receiving the control signal from the delay detector when the time delay event is detected, transmits one or more subsequent communication packets over a plurality of redundant communication channels.

13. The system of claim 7, wherein the NCS is a power system, a water system, a wastewater system, or a transportation system.

* * * * *